United States Patent [19]

Loce et al.

[11] Patent Number: 5,260,799
[45] Date of Patent: Nov. 9, 1993

[54] PULSED IMAGING, PULSE WIDTH MODULATION SCANNER FOR A TRI-LEVEL HIGHLIGHT COLOR IMAGING SYSTEM

[75] Inventors: Robert P. Loce, Rochester; Martin E. Banton, Fairport, both of N.Y.; Melvin E. Swanberg, Claremont, Calif.; William L. Lama, Webster, N.Y.; Michael S. Cianciosi; Susan E. Feth, both of Rochester, N.Y.; Kevin J. Garcia, Tucson, Ariz.; Peter K. Wu, LaPalma; Girmay K. Girmay, Inglewood, both of Calif.

[73] Assignee: Xerox Corporation, Stamford, Conn.

[21] Appl. No.: 756,643

[22] Filed: Sep. 9, 1991

[51] Int. Cl.$^5$ .............................................. H04N 1/40
[52] U.S. Cl. ................................ 358/300; 355/326 R; 346/157
[58] Field of Search ................. 358/300; 355/326, 327, 355/328; 346/157, 160

[56] References Cited

U.S. PATENT DOCUMENTS

| | | | |
|---|---|---|---|
| 4,855,841 | 8/1989 | Shimada | 358/300 X |
| 4,862,289 | 8/1989 | Shimada | 358/300 X |
| 4,990,955 | 2/1991 | May et al. | 355/208 |
| 5,066,979 | 11/1991 | Goto et al. | 355/326 X |
| 5,124,802 | 6/1992 | Ito et al. | 358/300 X |

OTHER PUBLICATIONS

"Scophony Spatial Light Modulator"; Optical Engineering, vol. 24, No. 1, Jan./Feb. 1985; Richard V. Johnson et al.

Primary Examiner—Benjamin R. Fuller
Assistant Examiner—Eric Frahm

[57] ABSTRACT

A pulsed imaging, facet tracked, Raster Output Scanner utilizes pulse width modulation in conjunction with spatial filtering to form three exposure levels at the surface of a charged photoreceptor medium, one of the levels associated with a specific color. This type of scanner with a nominal video rendering experiences a color line growth in the process direction. The line growth problem is caused by a coherent optical effect. The resultant output print has bolded color lines in the process direction. Several techniques are set forth to compensate for this line growth. In a preferred technique, the video data stream is modified by locating or positioning video pulses representing white information at the start of an associated pixel time period. When the color pixel is imaged, it will therefore, always abut an adjoining white pulse and will be inhibited from spreading into the adjacent pixel period. Other techniques rely upon inversion of white pulses, or separation of white pulses into two signals, each segment moved to the beginning and the end of the associated pixel period. According to another technique, the input data stream is buffered and pixel groups examined to identify neighboring white and color signals. These signals are then either narrowed or in the case of a sequence of color signals, the lead and trail edge of the color signals are trimmed.

18 Claims, 19 Drawing Sheets

PULSED IMAGING, PULSE WIDTH MODULATION SCANNER FOR A TRI-LEVEL HIGHLIGHT COLOR IMAGING SYSTEM

BACKGROUND AND MATERIAL DISCLOSURE STATEMENT

The present invention relates generally to a pulsed imaging, facet tracked, pulse width modulation Raster Output Scan (ROS) system for creating tri-level images at a photosensitive surface, said images compensated for color line growth.

In the practice of conventional bi-level xerography, it is the general procedure to form electrostatic latent images on a charge retentive surface such as a photoconductive member by first uniformly charging the charge retentive surface. The electrostatic charge is selectively dissipated in accordance with a pattern of activating radiation corresponding to original images. The selective dissipation of the charge leaves a bi-level latent charge pattern on the imaging surface where the high charge regions correspond to the areas not exposed by radiation. One level of this charge pattern is made visible by developing it with toner. The toner is generally a colored powder that adheres to the charge pattern by electrostatic attraction. The developed image is then fixed to the imaging surface, or is transferred to a receiving substrate such as plain paper, to which it is fixed by suitable fusing techniques.

In tri-level, highlight color imaging, unlike conventional xerography, upon exposure, three charge levels are produced on the charge-retentive surface. The highly charged (i.e. unexposed) areas are developed with toner, and the area more fully discharged is also developed, but with a toner of a different color. Thus, the charge retentive surface contains three exposure levels; zero exposure, intermediate exposure, and full exposure, which correspond to three charge levels. These three levels can be developed to print, for example, black, white, and a single color.

FIG. 1 is a schematic drawing of a prior art tri-level printing system. As shown, the system utilizes a charge retentive member in the form of a photoconductive belt 10, consisting of a photoconductive surface on an electrically conductive, light-transmissive substrate mounted for movement past a charge station A, an exposure station B, developer station C, transfer station D, and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller, and the latter of which can be used to provide suitable tensioning of the photoreceptor belt 10. Motor 23 rotates roller 18 to advance belt 10 in the direction of arrow 16. Roller 18 is coupled by motor 23 by suitable means such as a belt drive.

As can be seen by further reference to FIG. 2, initially successive portions of belt 10 pass through charging station A, where a corona discharge device such as a scorotron, corotron, or dicorotron, indicated generally by the reference numeral 24, charges the belt 10 to a selectively high uniform positive or negative potential, $V_0$. Any suitable control circuit, as well known in the art, may be employed for controlling the corona discharge device 24.

Next, the charged portions of the photoreceptor surface are advanced through exposure station B. At exposure station B, the uniformly charged surface of belt 10 is exposed by a tri-level raster output scanner (ROS) unit 25, which causes the charge retentive surface to be discharged in accordance with the output from the scanning device. This scan results in three separate discharge regions on the photoreceptor, each region exposed at one of three possible levels: (1) zero exposure which results in a voltage equal to $V_{ddp}$ and will be developed using charged-area-development (CAD); (2) full exposure, which results in a low voltage level $V_C$ and is developed using discharged-area-development (DAD); and (3) intermediate exposure, which yields an intermediate voltage level $V_W$ and does not develop and yields a white region on the print. These voltage levels are shown schematically in FIG. 2. Some typical voltage levels are as follows.

The photoreceptor, which is initially charged to a voltage $V_0$, undergoes dark decay to a level $V_{ddp}$ (VCAD) equal to about $-900$ volts. When exposed at the exposure station B, the photoreceptor is discharged to $V_c$, ($V_{DAD}$) equal to about $-100$ volts in the highlight (i.e. color other than black) color portions of the image. The photoreceptor is also discharged to $V_w$ ($V_{white}$) equal to $-500$ volts imagewise in the background (i.e. white), image areas and in the inter-document area. Thus the image exposure is at three levels; zero exposure (i.e. black), intermediate exposure (white) and full exposure (i.e. color). After passing through the exposure station, the photoreceptor contains highly charged areas and fully discharged areas which correspond to CAD and DAD color latent images, and also contains an intermediate level charged area that is not developed.

At development station C, a development system, indicated generally by the reference numeral 30, advances developer materials into contact with the CAD and DAD electrostatic latent images. The development system 30 comprises first and second developer housings 32 and 34. The developer housing 32 contains a pair of magnetic brush rollers 35 and 36. The rollers advance developer material 40 into contact with the photoreceptor for developing the charged-area regions ($V_{CAD}$). The developer material 40, by way of example, contains positively charged black toner. Electrical biasing is accomplished via power supply 41, electrically connected to developer apparatus 32. A suitable DC bias, $V_{bb}$, of approximately $-600$ volts is applied to the rollers 35 and 36 via the power supply 41.

The developer housing 34 contains a pair of magnetic rolls 37 and 38. The rollers advance developer material 42 into contact with the photoreceptor for developing the discharged-area regions ($V_{DAD}$). The developer material 42, by way of example, contains negatively charged red toner. Appropriate electrical biasing is accomplished via power supply 43 electrically connected to developer apparatus 34. A suitable DC bias, $V_{cb}$, of approximately $-400$ volts is applied to the rollers 37 and 38 via the bias power supply 43.

Because the composite image developed on the photoreceptor consists of both positive and negative toner, a positive pre-transfer corona discharge member (not shown) is provided to condition the toner for effective transfer to a substrate, using positive corona discharge. The pre-transfer corona discharge member is preferably an AC corona device, biased with a DC voltage to operate in a field sensitive mode, to perform tri-level xerography pretransfer charging in a way that selectively adds more charge (or at least comparable charge) to the region of the composite tri-level image that must have its polarity reversed. This charge discrimination is enhanced by discharging the photoreceptor carrying the composite developed latent image with light before the pre-transfer charging this minimizes the tendency to overcharge portions of the image which are already at the correct polarity.

Referring again to FIG. 1, a sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the upper most sheet of a stack of copy sheets. Feed rolls rotate to advance the uppermost sheet from the stack into a chute, which directs the advancing sheet of support material into contact with the surface of belt 10 in a timed sequence, so that the developed toner powder image contacts the advancing sheet of support material at transfer station D.

Transfer station D includes a corona generating device 60 which sprays ions of a suitable polarity onto the backside of sheet 58. This attracts the charged toner powder images from the belt 10 to sheet 58. After transfer, the sheet continues to move in the direction of arrow 62 onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68, with the toner powder image contacting fuser roller 66. In this manner, the toner powder image is permanently affixed to sheet 58. After fusing, a chute, not shown, guides the advancing sheet 58 to a catch tray (also not shown), for subsequent removal from the printing machine by the operator.

After the sheet of support material is separated from the photoconductive surface of belt 10, the residual toner particles carried by the non-image areas on the photoconductive surface are removed therefrom. These particles are removed at cleaning station F. A magnetic brush cleaner housing is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (notshown) floods the photoconductive surface with light to dissipate any residual electrostatic charge remaining, prior to the charging thereof, for the successive imaging cycle. Stabilization of the white or background discharge voltage level is accomplished by monitoring photoreceptor white discharge level in the inter-document area of the photoreceptor using an electrostatic voltmeter (ESV) 70. The information obtained thereby is utilized by control logic 72 to control the output of ROS unit 25 so as to maintain the white discharge level at a predetermined level. Further details of this stabilization technique are set forth in U.S. Pat. No. 4,990,955, assigned to the same assignee as the present Invention.

There are several scanning techniques known in the prior art to obtain the tri-level exposure imaging. A conventional flying spot scanner, such as used in the Canon 9030 uses a ROS unit to "write" an exposed image on a photoreceptive surface a pixel at a time. To obtain higher spatial resolution, a pulse imaging scanner can be utilized. This pulse imaging scanner is also referred to as a Scophony scanner in an article in Optical Engineering, Vol. 24, No. 1, Jan./Feb. 1985, *Scophony Spatial Light Modulator*, by Richard Johnson et al., whose contents are hereby incorporated by reference. A preferred technique, capable of higher spatial resolution is to use similar optical elements as the flying spot scanner (rotating polygon, laser light source, pre polygon and post polygon optics), but with an A/O modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD exposure.

Instead of obtaining an intermediate exposure level by controlling the acoustic amplitude, according to a first object of the present invention, an intermediate exposure is provided by using pulse width modulation in a pulse Imaging system In conjunction with spatial filtering. Use of a pulsed imaging scanner with pulse width modulation, however, may result in image quality problems. Using an intuitive, or conventional approach to pulse width modulation, in which the pulses are centered on the pixels, leads to color text and graphics in output prints that have a "bloated" or bolded appearance, especially when compared to black images produced on the same printer. Furthermore, the color lines are asymmetric. Color lines running in the process (slow scan) direction are significantly wider than lines running across the process in the fast scan direction. According to a second aspect of the present invention, and in a preferred embodiment, the color line growth problem is eliminated by shifting the white video pulses from the center to the beginning of the white pixel time period. In a second embodiment, each white pixel pulse is divided into two equal sections, each section shifted to the outside edge of the white pixel time period. In still further embodiments, and alternatively, the red pixel or white pixel video pulse width is narrowed to reduce the effective width of the red or white pulse, respectively. A still further embodiment set forth is to trim off the lead edge of a lead red pixel pulse and the trail edge of a trailing red pixel pulse in a red line, in the video signal.

More particularly, the present invention relates to a pulsed imaging, facet tracked, pulse width modulation scanner incorporating a spatial filter for creating tri-level images on a photoreceptor member comprising:

means for uniformly charging the surface of said photoreceptor member, means for providing a coherent, focused beam of radiant energy, control circuit means for converting an image bit map video data stream into a composite analog video image data stream consisting of a plurality of pixel periods, each period having a signal content representing charged area (black), discharge image area (color), and intermediate discharge level area (white) to be formed on the surface of said photoreceptor member, an acoustooptic modulator for modulating said beam in response to said analog image video data stream simultaneously applied to the modulator to provide a modulated optical video output, a rotatable scanning element interposed between said photoreceptor member and said radiant energy source, said scanning element having a plurality of facets for intercepting the modulated video output and repeatedly scanning said output across the surface of said photoreceptor to form the tri-level discharge areas, and optical means for performing a Fourier transformation of the modulated, optical video output and for projecting the Fourier profile onto facets of the rotating scanning element positioned in the Fourier plane, said optical means further including prepolygon, spatial bandpass filtering means.

IN THE DRAWINGS

Figure 6:
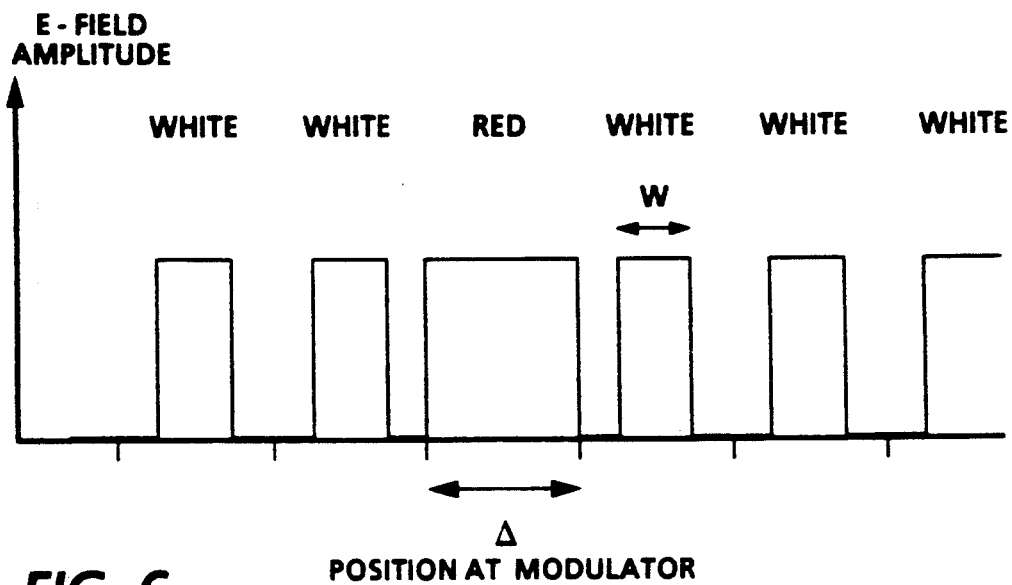
FIG. 6 shows the E-Field amplitude of a red/white pixel pattern exiting the A/O modulator with the white pulses centered within the pixel period.
Figure 7A:
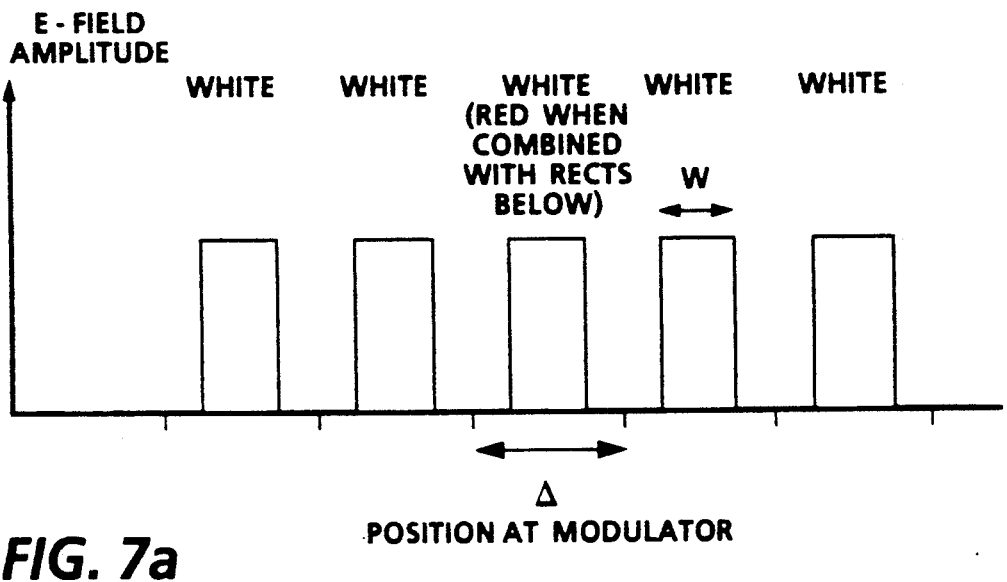

FIGS. 7a and b show the A/O modulator E-Field pattern of FIG. 6 split into several additive parts.

Figure 8:
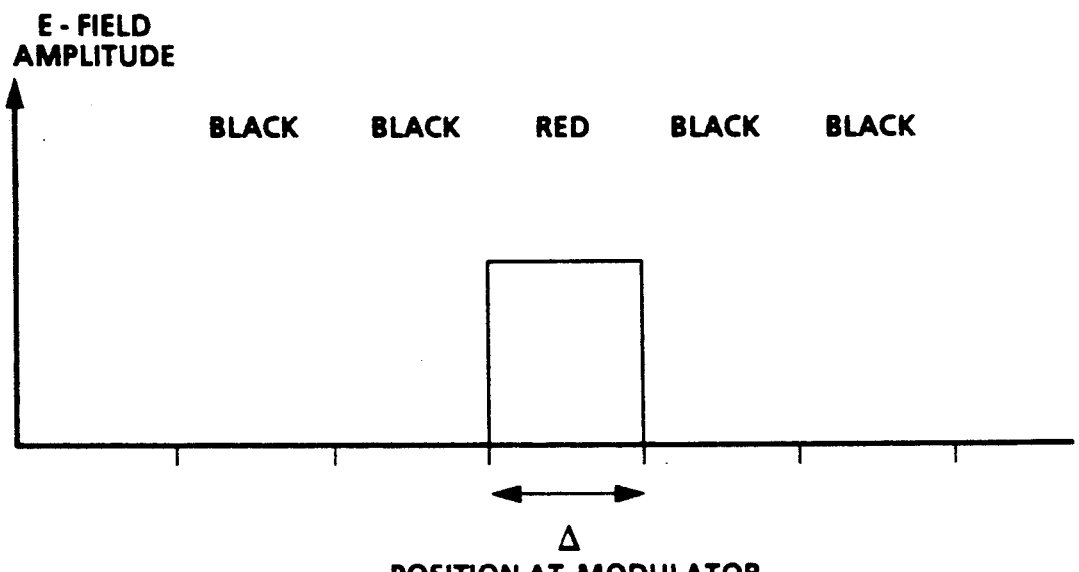

FIG. 8 shows the A/O modulator E-Field amplitude of a red/black pixel pattern.

Figure 9A:
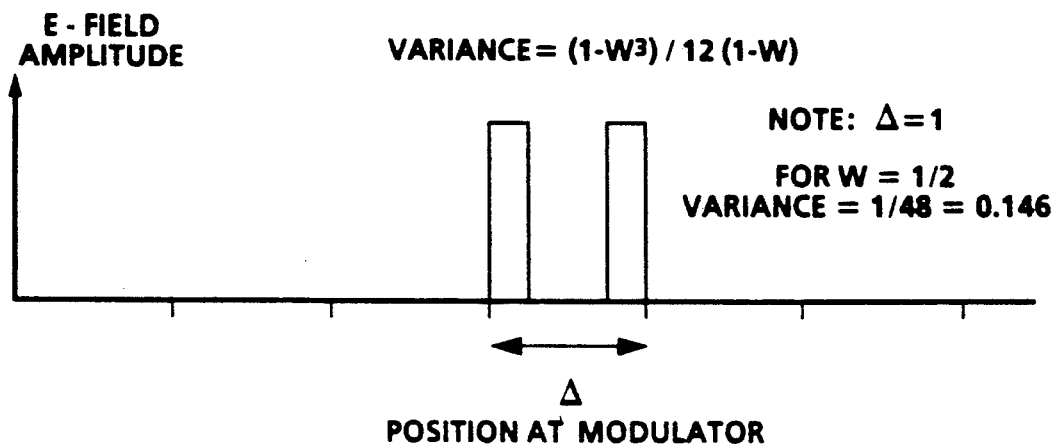

FIGS. 9a and b show the optical object for line formation when imaging one red pixel on either a white (top) or black background.

Figure 10:
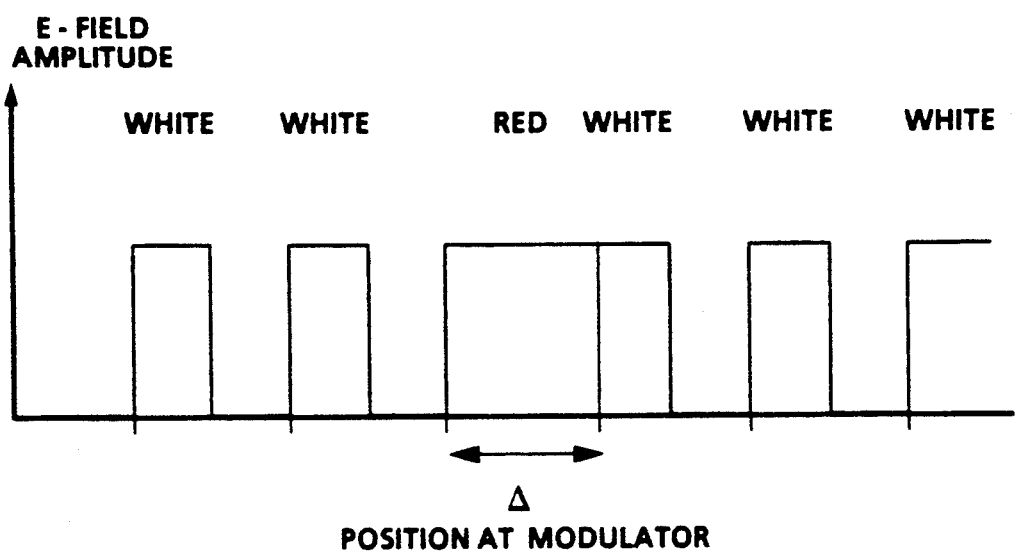

FIG. 10 shows the A/O modulator E-Field amplitude for a corrected red/white pattern with all white pulses shifted to the leading edge of each pixel period.

FIG. 11 shows the separated parts of the signal shown in FIG. 10.

Figure 12A:
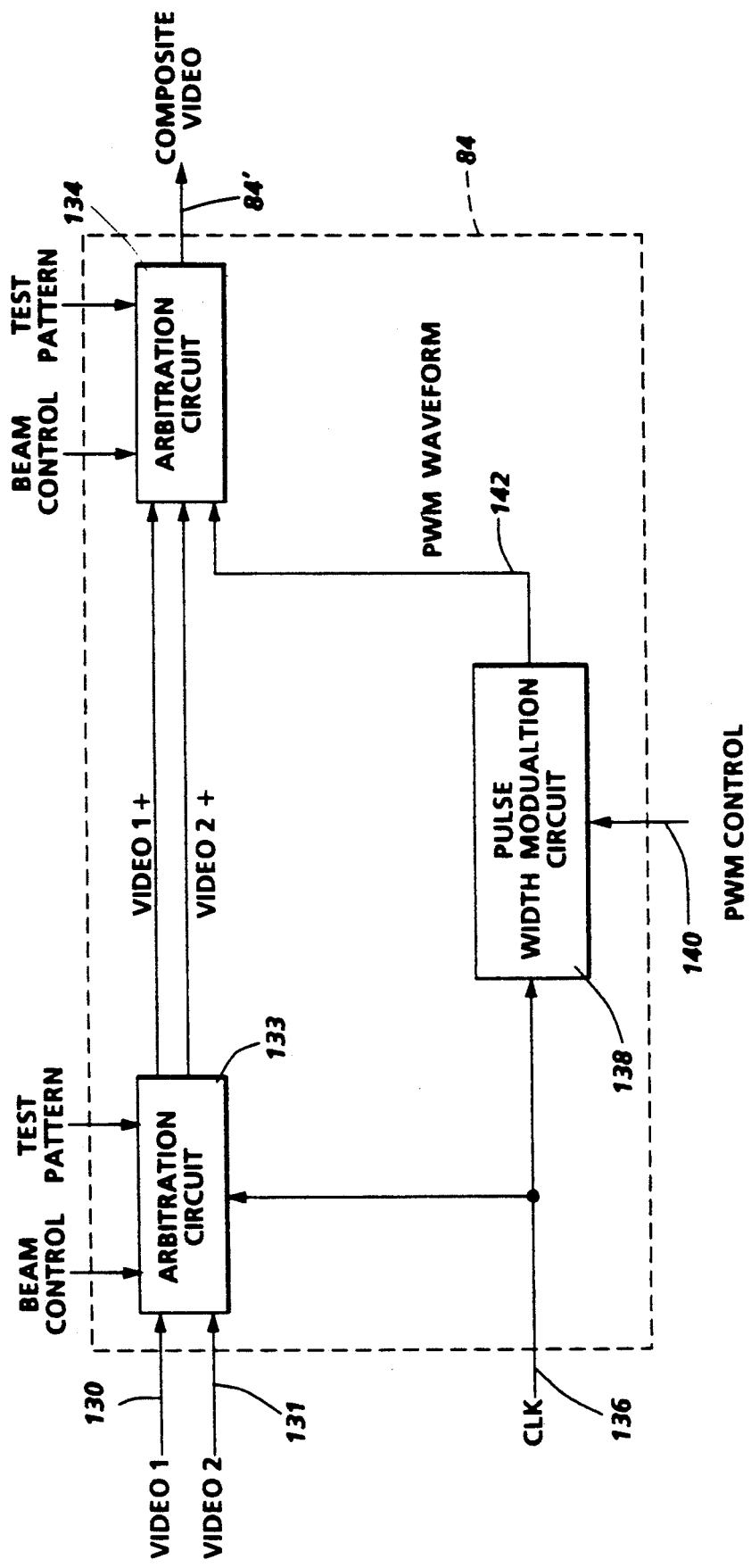
Figure 12B:
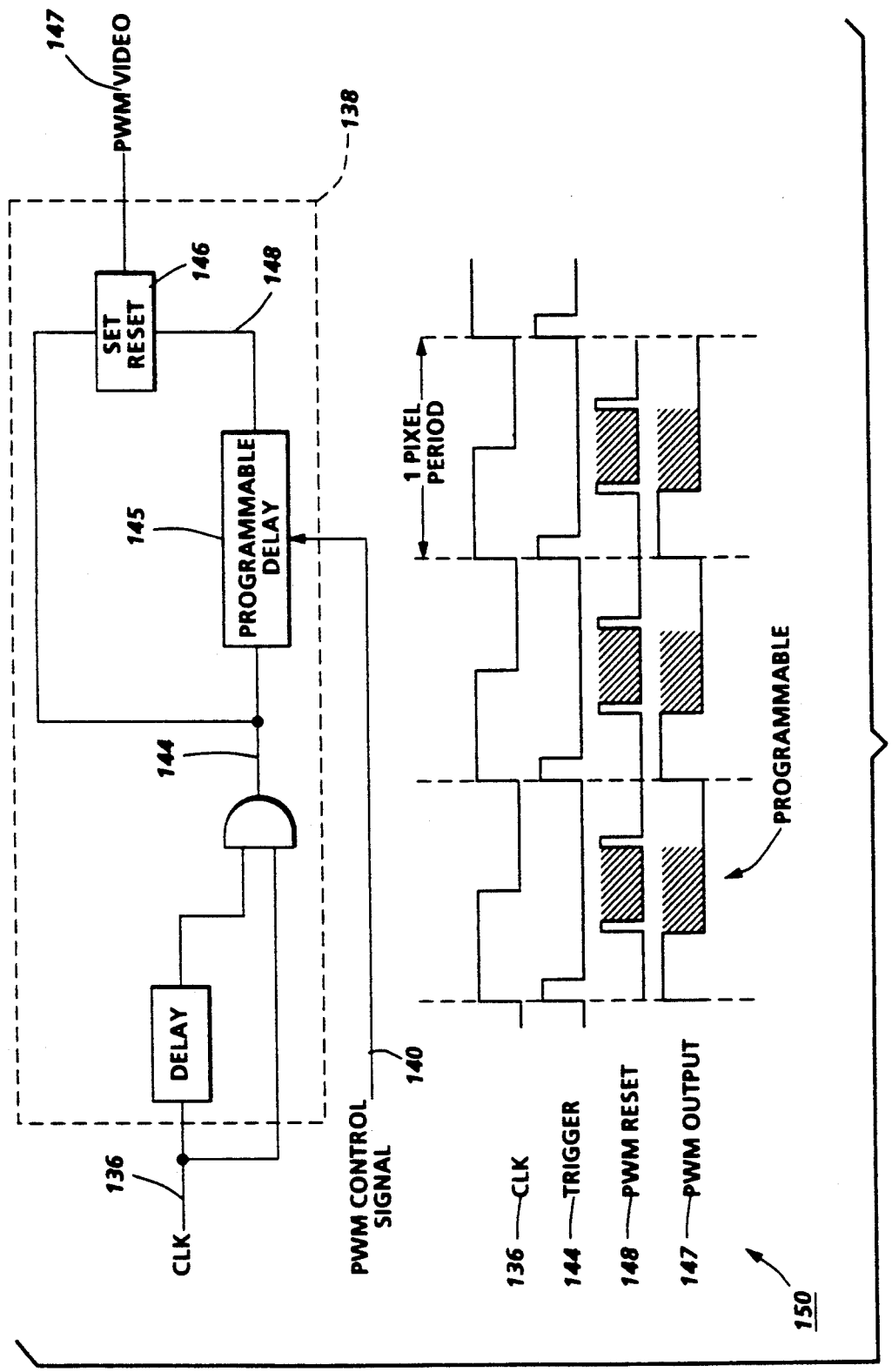

FIG. 12a and 12b are schematic block diagrams of the pulse width, pulse modulation (PWPM) circuitry used to create the white video pulses in positions shown in FIG. 10.

Figure 13:
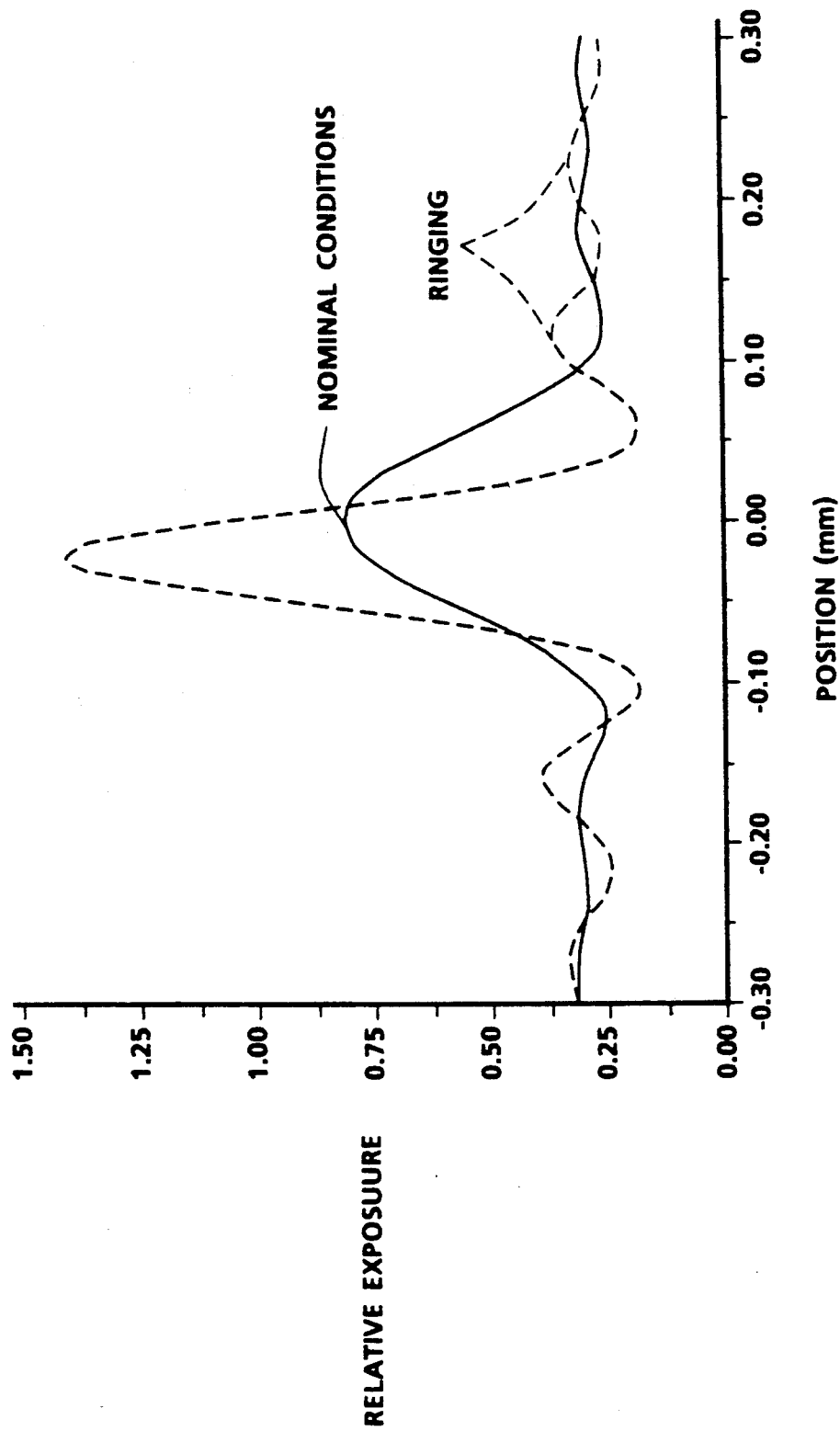

FIG. 13 is the relative exposure distribution of a single pixel red line on a white background under nominal and corrected conditions.

Figure 14A:
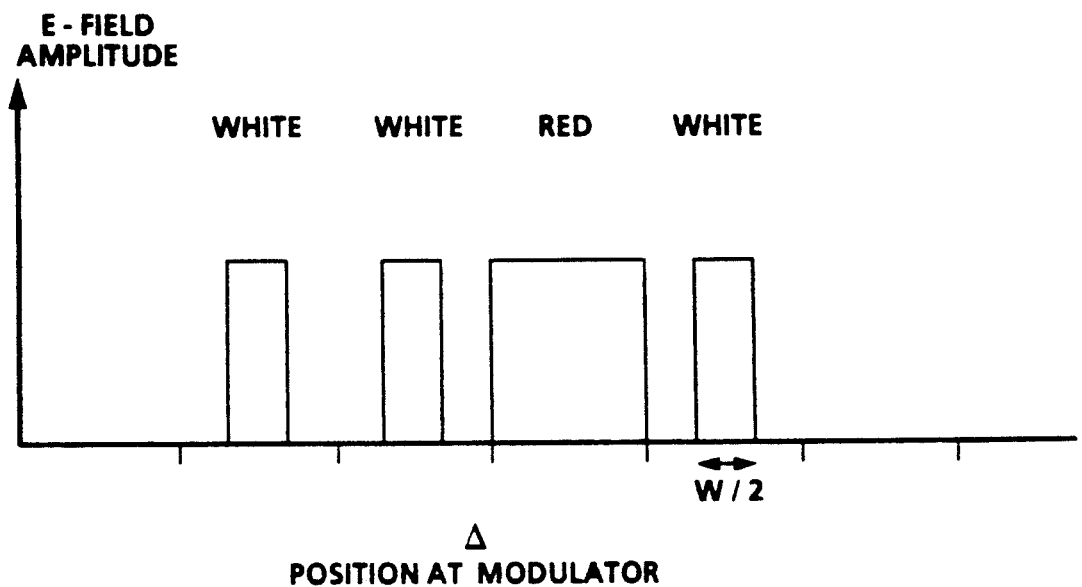
Figure 14B:
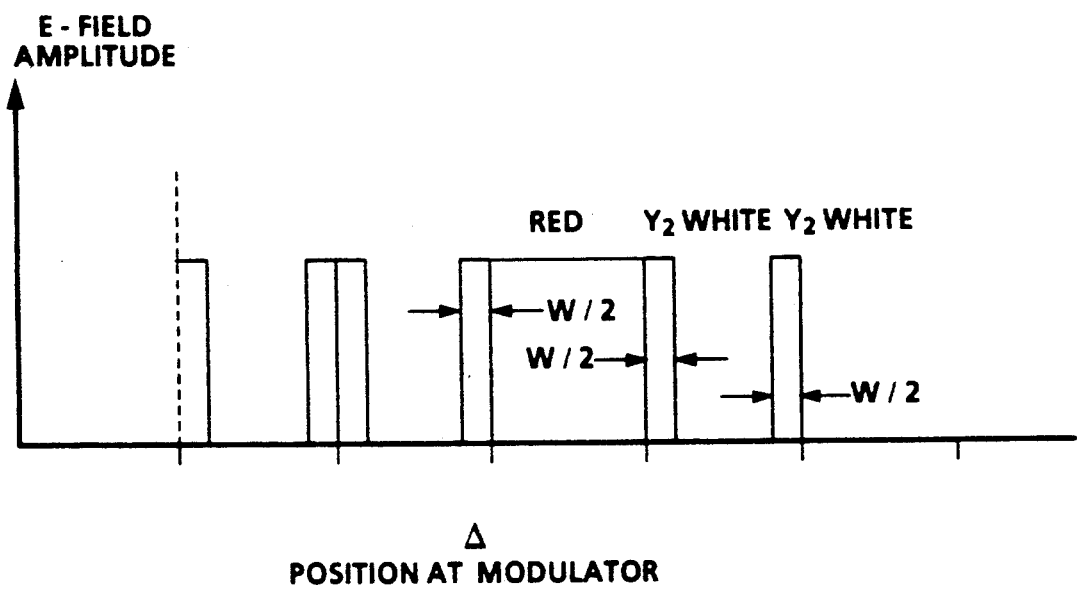

FIG. 14 shows the E-Field amplitude for a corrected red/white pixel pattern with all white pulses divided in half and shifted to the leading and trailing edge of each pixel frame.

Figure 15:
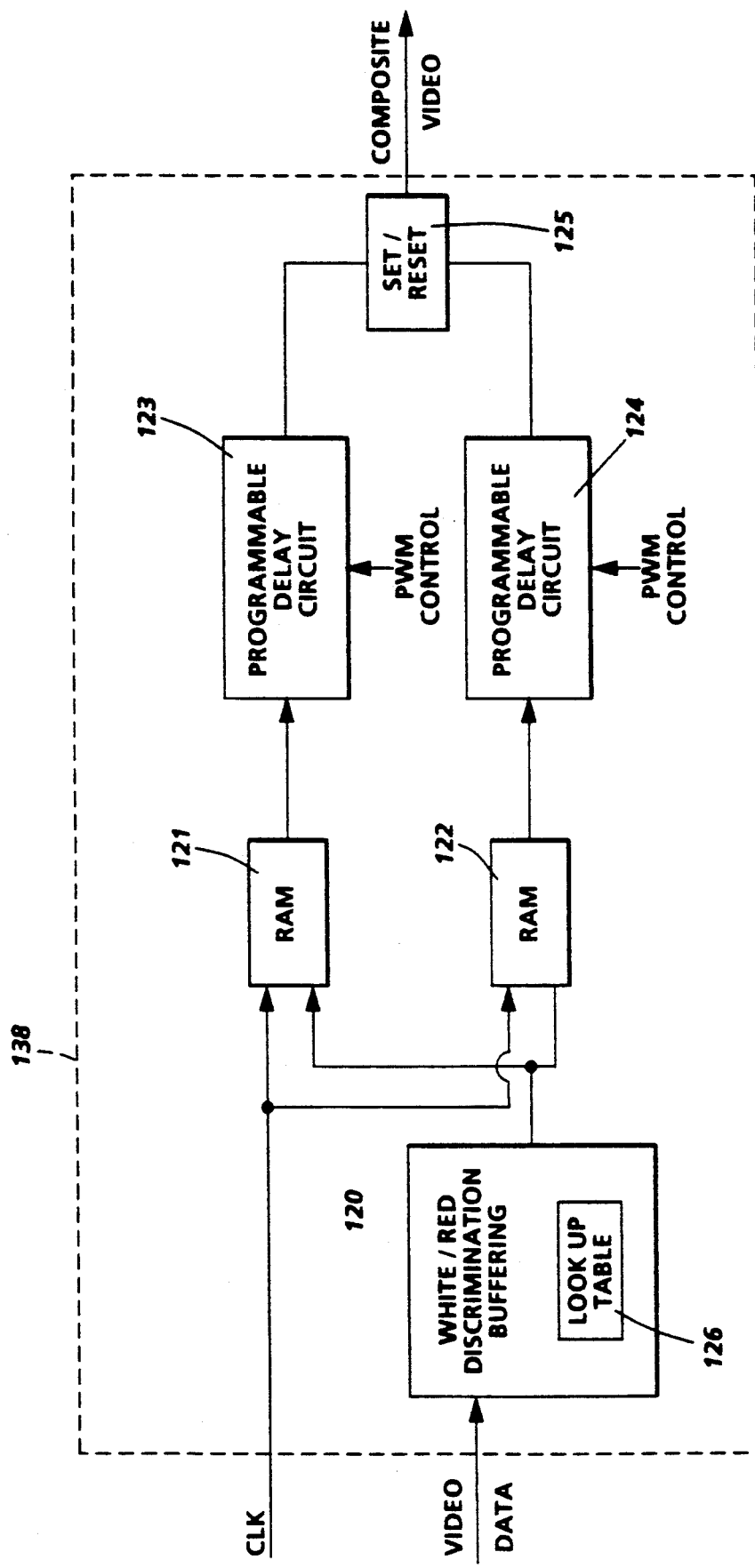

FIG. 15 shows an alternate embodiment of the circuitry of FIG. 12b.

Figure 16:
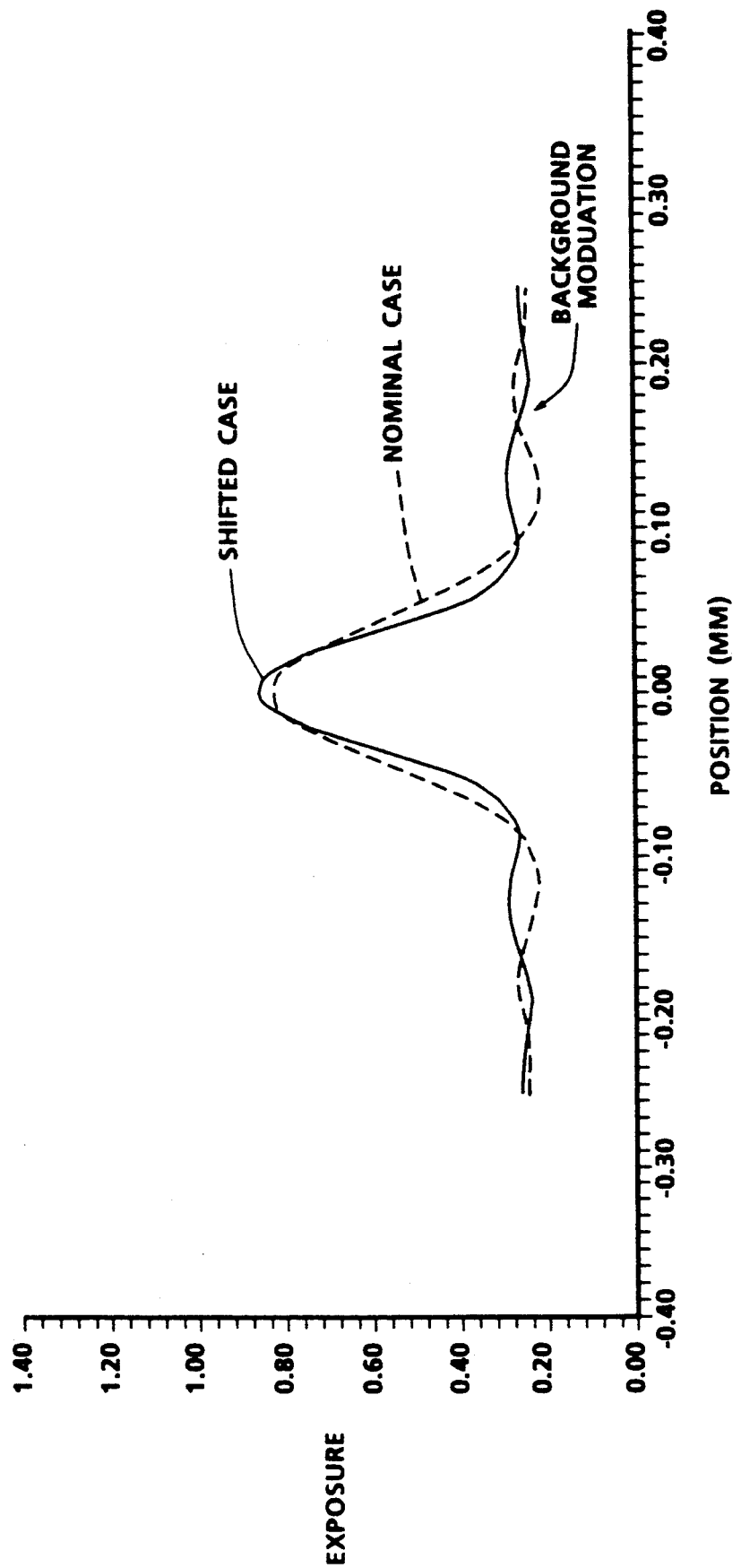

FIG. 16 is the relative exposure distribution where the white pixel pulses neighboring a red pixel have been shifted away from the red pixel.

Figure 17:
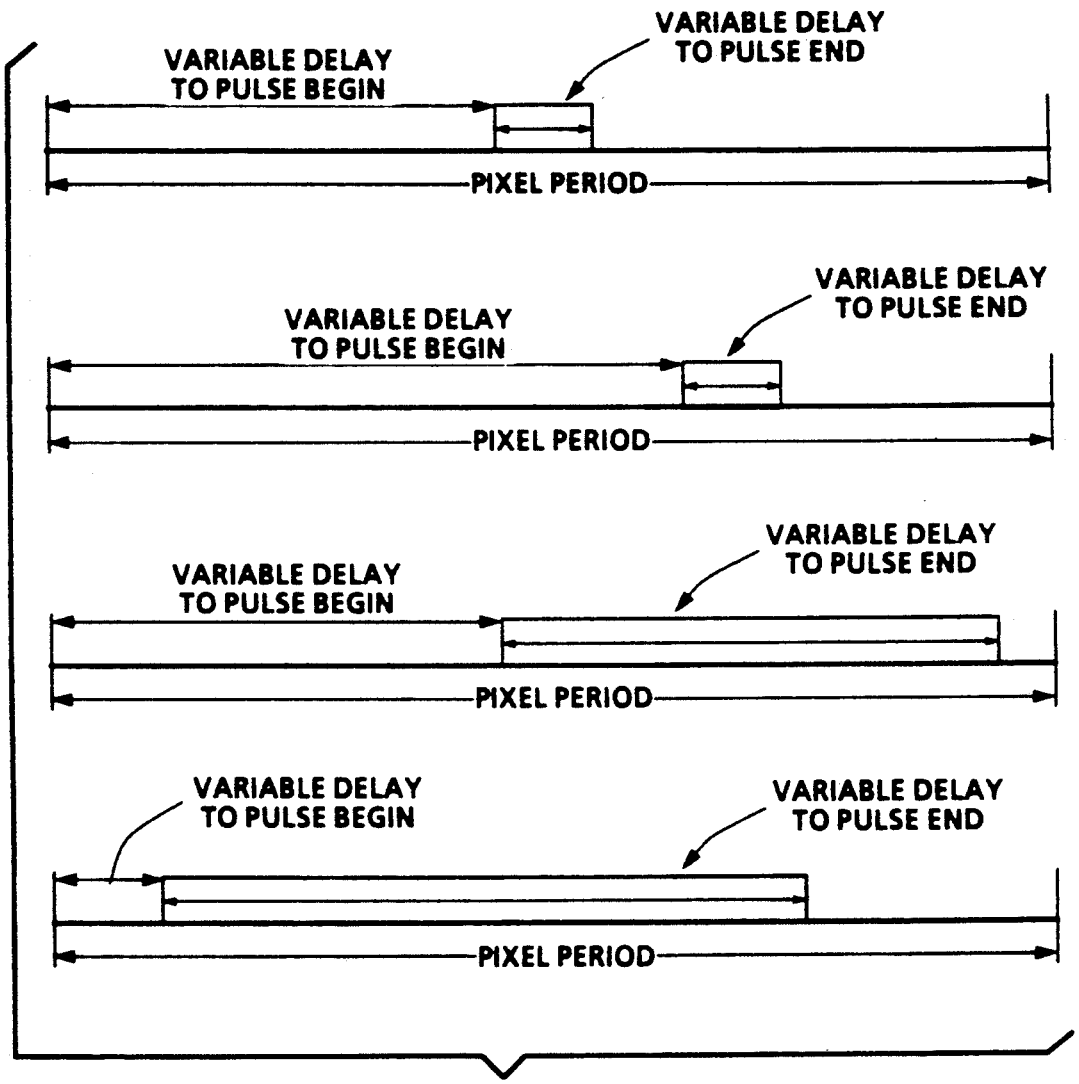

FIG. 17 shows the various pulse width and pulse position combinations possible with the PWPM circuitry of FIG. 16.

Figure 18:
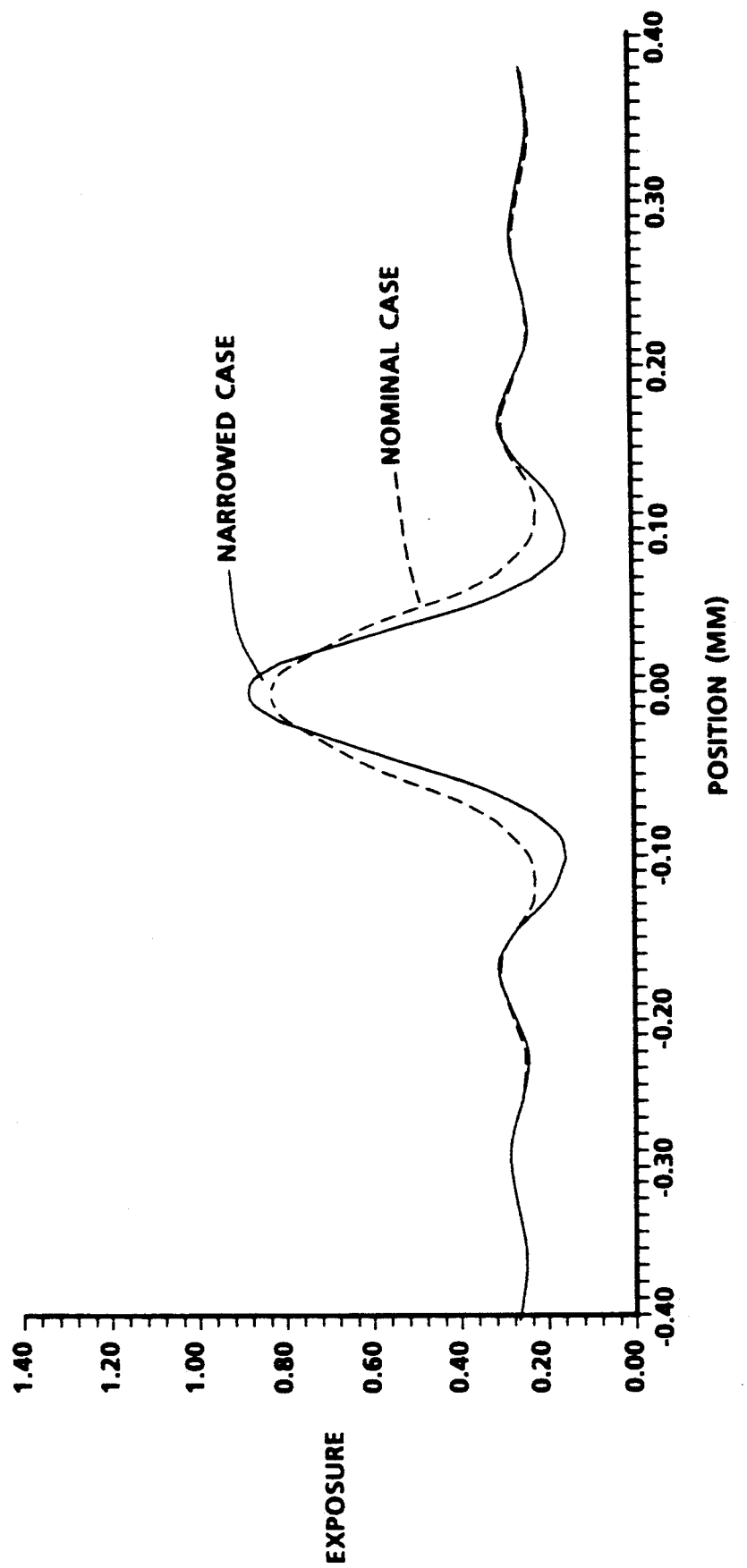

FIG. 18 is a relative exposure plot where the white pixels that neighbor the red pixel have been narrowed from a nominal pulse width.

Figure 19:
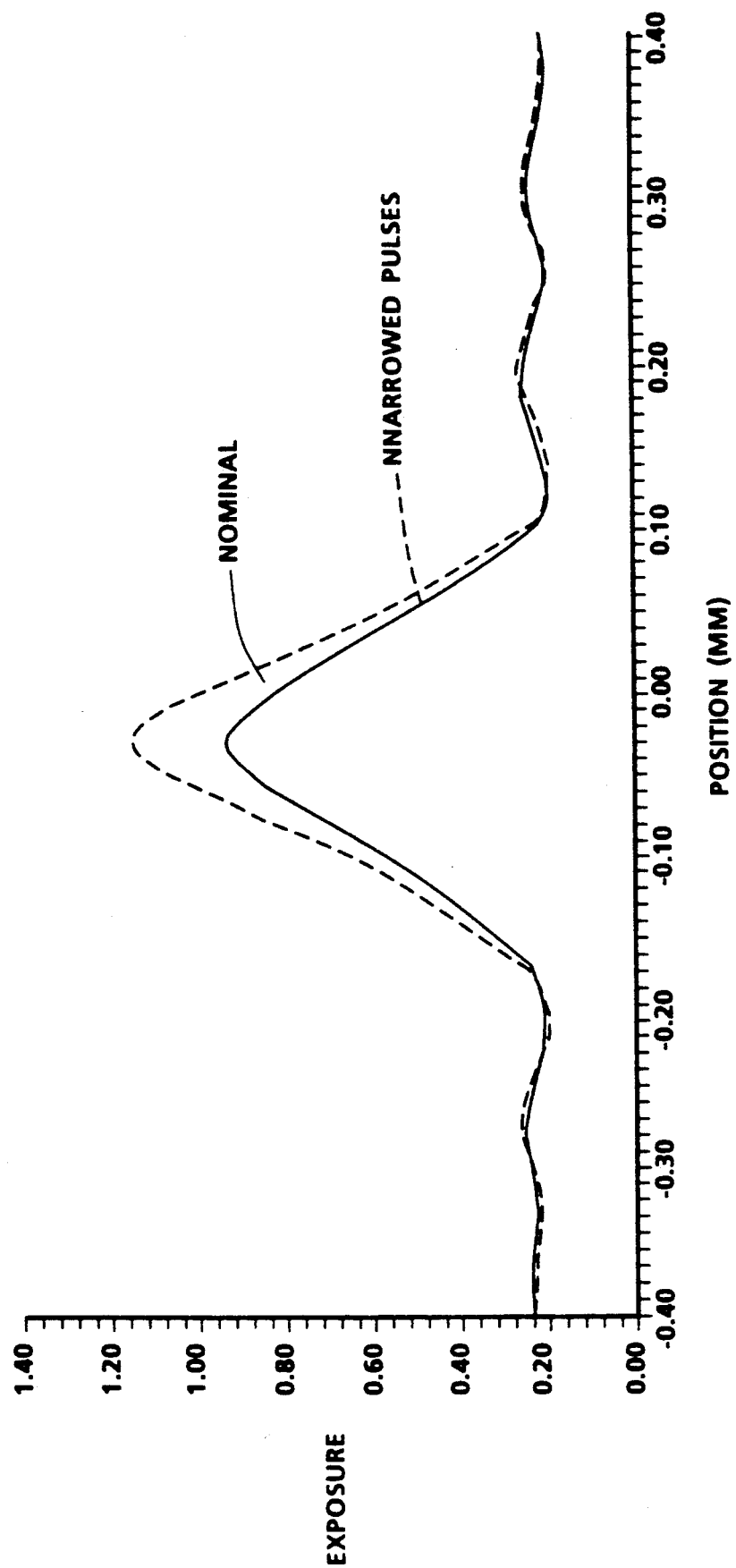

FIG. 19 shows the relative exposure distribution for two red pixel widths reduced by 10%.

DESCRIPTION OF INVENTION

Figure 3:
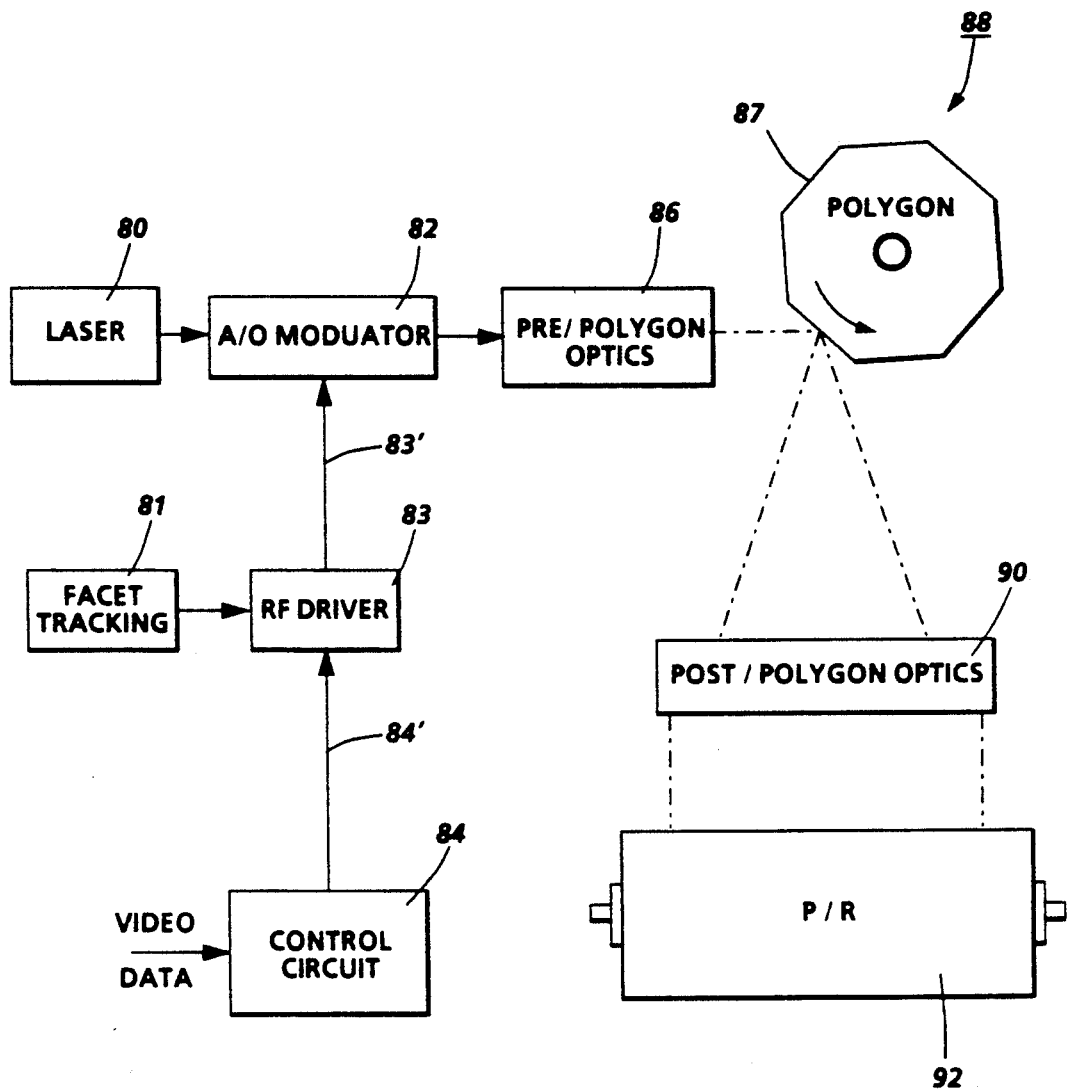
FIG. 3 is a schematic view of a pulsed imaging pulse width modulation, facet tracked Raster Output Scanning system.
Figure 4A:
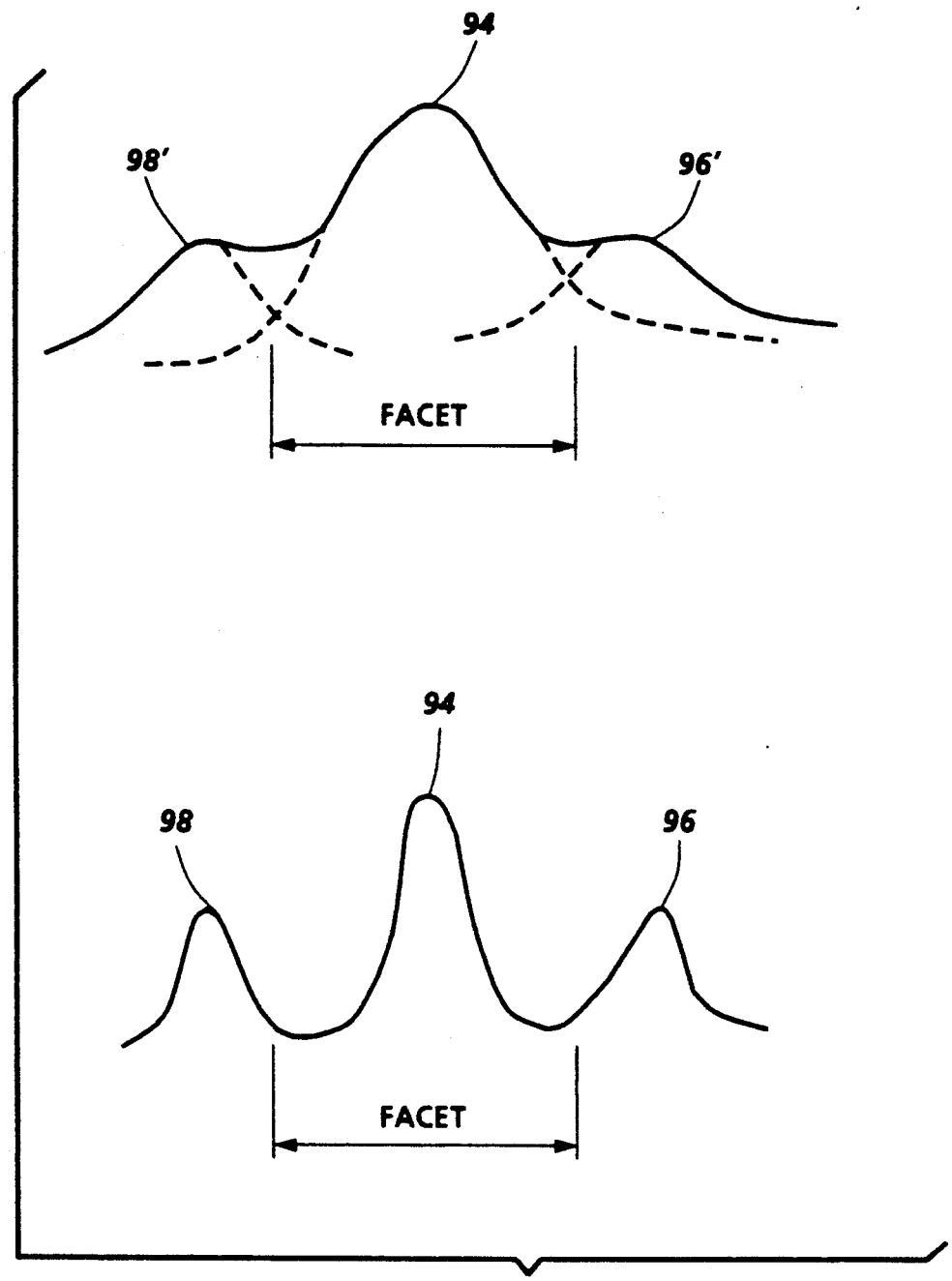
FIG. 4a and 4b show the filtering effects of polygon facets used in the ROS system of FIG. 3.

FIG. 3 is a schematic representation of a pulsed imaging, pulse width modulation, facet tracked ROS system, according to a first aspect of the present invention. A focused beam of light from a laser 80 is applied to acoustooptic (A/O) modulator 82. A control circuit 84 converts an image bitmap video data stream Into an analog video data stream consisting of a plurality of pixel periods, each period having a signal content representing charged area (black), discharge image area (color) and intermediate discharge (white) to be formed on the surface of photoreceptor 92. Circuit 84 controls the drive level of modulator 82. The light output profile emerging from modulator 82 is defined by the overlap of the acoustic pulses and the illuminating light beam from laser 80 and enables individual acoustic pulses to be imaged onto photoreceptor 92. In the fast scan direction, the anamorphic prepolygon optics 86 performs a Fourier transformation of the optical pulses exiting the A/O modulator, and projects the Fourier profile onto facets 87 of rotating polygon 88. The polygon is placed at the back focal plane of the post polygon optics 90 and the front focal plane of the prepolygon optics 86. The frequency of the rf used to excite the modulator is swept in synchronism with the scanning across the photoreceptor by means of facet tracking circuit 81 and rf driver circuit 83 so that the Fourier profile remains centered on the facets 87 of the rotating polygon 90. The size of the zero order spot at the facet is dependent on, and is inversely proportional to, the size of the beam in the modulator, with the diffracted orders also exhibiting this same beam size. As shown in FIG. 4a, if the beam in the modulator is small, as it would be in a prior art flying spot scanning system, or "shallow" pulse imaged system, then the zero order beam size as well as the beam size of the diffracted orders (96' and 98') will be large, and even the beams of the highest diffracted orders will overlap the zero order beam. If the beam in the modulator is large, as it would be in the "deep" pulse imaged system of the present invention, then the zero order beam 94 size at the facet will be small, as will the beam size of the diffracted orders 96 and 98.

When pulse width modulation is being applied to reduce the exposure level of a string of "on" pixels, the average light level that passes through the modulator is proportional to the duty cycle of the pulse stream. However, since the sideband energy does not pass beyond the facet, the average light level is further reduced, the actual reduction depending on the higher harmonic content that is passed to the acoustic wave. In practice, It can be expected that pulse width modulation at a 50% duty cycle will result in an exposure level of about 25%.

Figure 1:
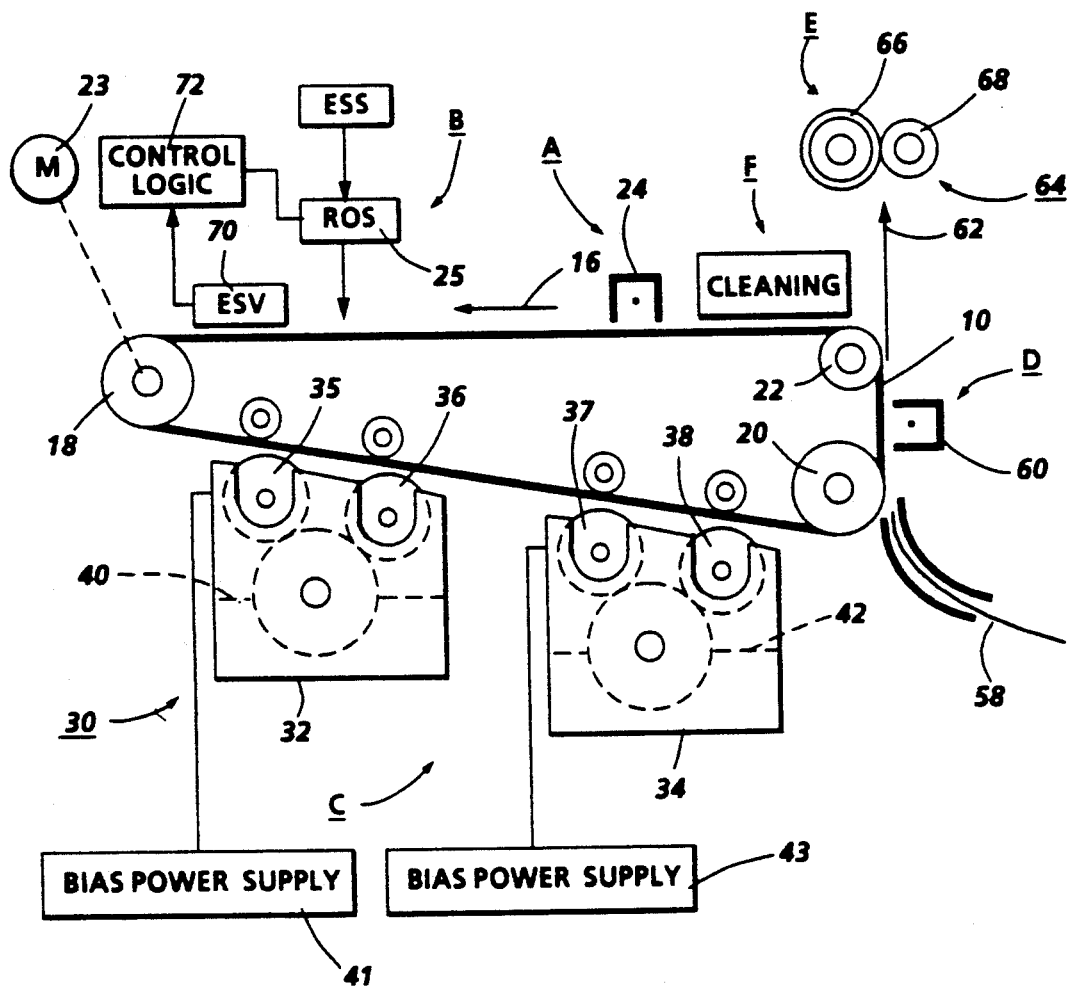
FIG. 1 is a schematic view of a prior art tri-level imaging system.
Figure 2A:
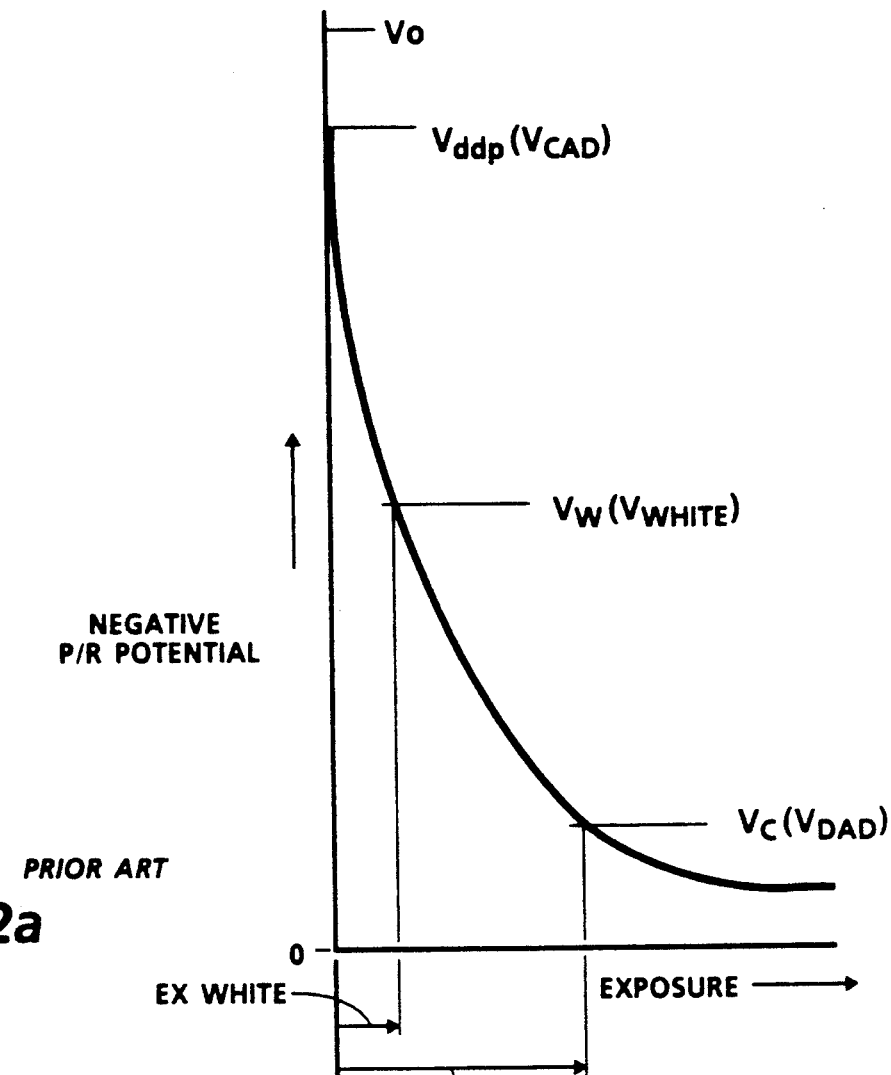
FIG. 2a and 2b show three voltage discharge levels obtained by the exposure system of FIG. 1.
Figure 2B:
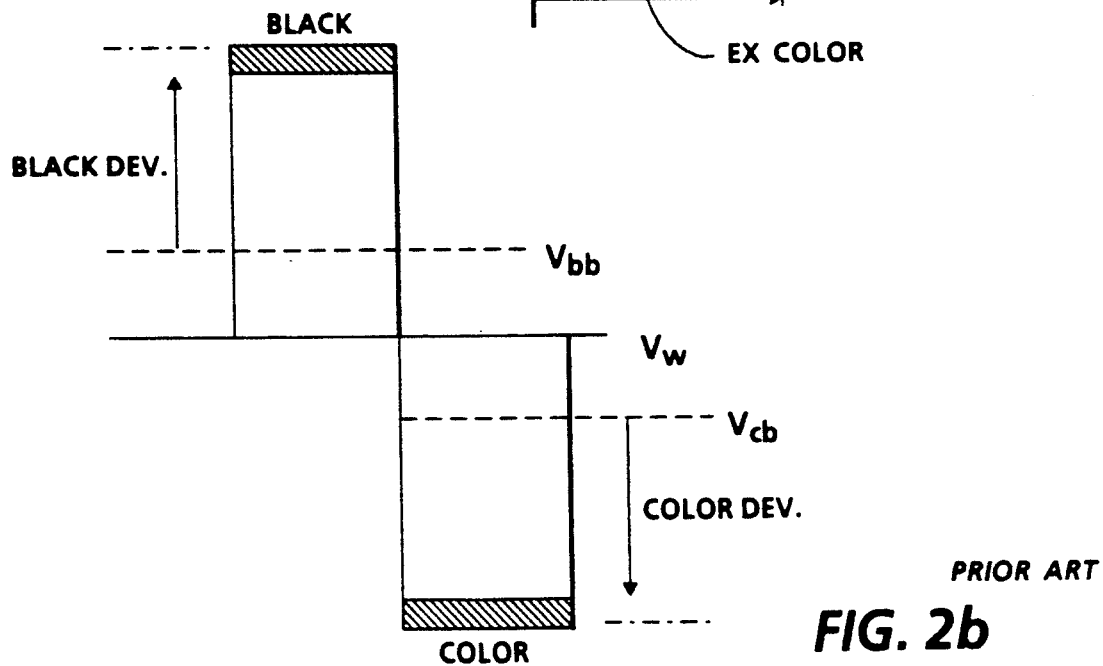
Figure 4B:
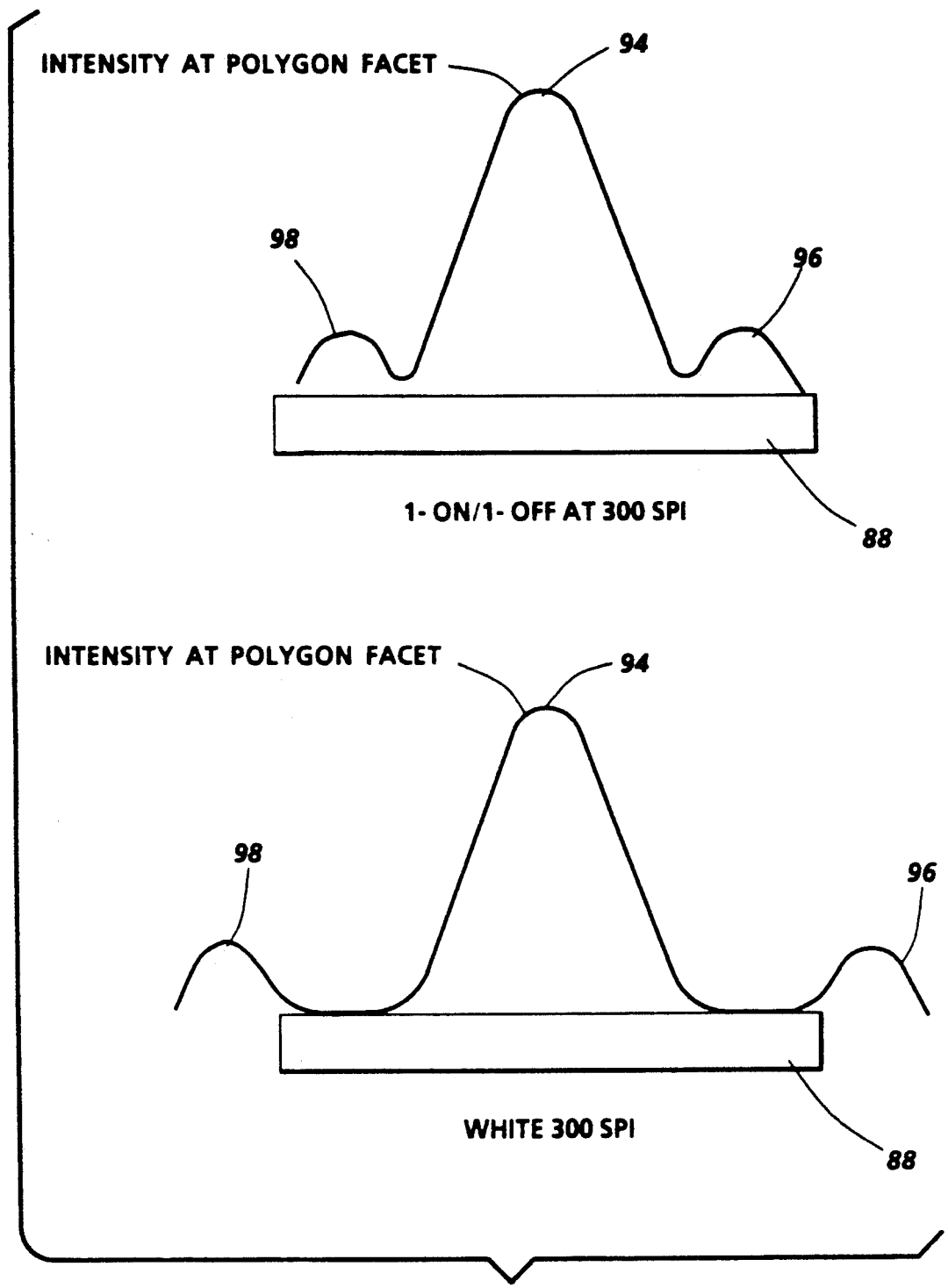

As polygon 88 rotates, the optical image of the acoustooptic video pattern is swept across the surface of photoreceptor 92, after passing through post polygon optics 90. Acoustic image motion at the photoreceptor surface which, if uncorrected, would blur the optical image, is cancelled by balancing the acoustic and scan velocities with the prepolygon and postpolygon optics magnification, resulting in the acoustic image remaining stationary on the photoreceptor. The imaged line Is exposed at three exposure levels, zero, intermediate and full as shown in FIG. 2a. The intermediate (white) exposure level is obtained from the pulse width narrowed video signals which become spatially narrow optical pulses exiting the modulator 82 and are filtered by facets 87 to result in a low uniform exposure at the photoreceptor 92. FIG. 4b shows a representation of the beam intensity at polygon facet 84 and demonstrates that an acoustooptic video stream alternating between one pixel on, and one pixel off, will produce an irradiance profile in the Fourier plane consisting of a single centered diffraction lobe (zero order beam) 94 and additional lobes 96, 98 that correspond to the pattern frequency. Since the polygon facets 87 are in the Fourier plane of the optical system, the limited size of each facet acts as a Fourier plane spatial frequency bandpass filter that limits the upper frequency that is reflected to the photoreceptor. In the top half of FIG. 4b, it is seen that the frequency associated with a 1-on/1-off pattern is passed through the optical system, thereby allowing printing of that frequency. The lower half of FIG. 4 shows the diffraction pattern for printing a uniform intermediate exposure. The pulse width modulated video pattern is turned on and off for each pixel, with the on time corresponding to the desired exposure level. The frequency of this pattern is twice that of the 1-on/1-off pattern and thus, the associated diffraction lobes fall off the polygon facet, whose facet width has been appropriately designed. This spatial frequency filtering of the optical signal results in a uniform intermediate level output. The spatial filtering may also be accomplished by providing a discrete spatial filter of appropriate design in the optical path between the prepolygon optics 86 and the polygon 88. The filter could be adapted to move synchronously with the polygon.

As mentioned above, the scanning system of FIG. 3 is subjected to a color line growth problem. To better appreciate the nature of the color line growth problem described above, FIG. 5 shows the calculated exposure distribution (dashed curve 100) for a single red pixel video pulse 102 on a white background (video for white pixels 104) and, for comparative purposes, the exposure distribution for a red pixel on a black background is shown as 106. Each white and red pixel video pulse is centered in the associated pixel time frame. The exposure distribution for a red line on the white background is seen as much wider than the red pixel on black background (the exposure distribution for the red line on black background has the desired width). Thus, the color line growth is seen as directly caused by the width of the red line exposure distribution produced in this video setting.

Figure 9B:
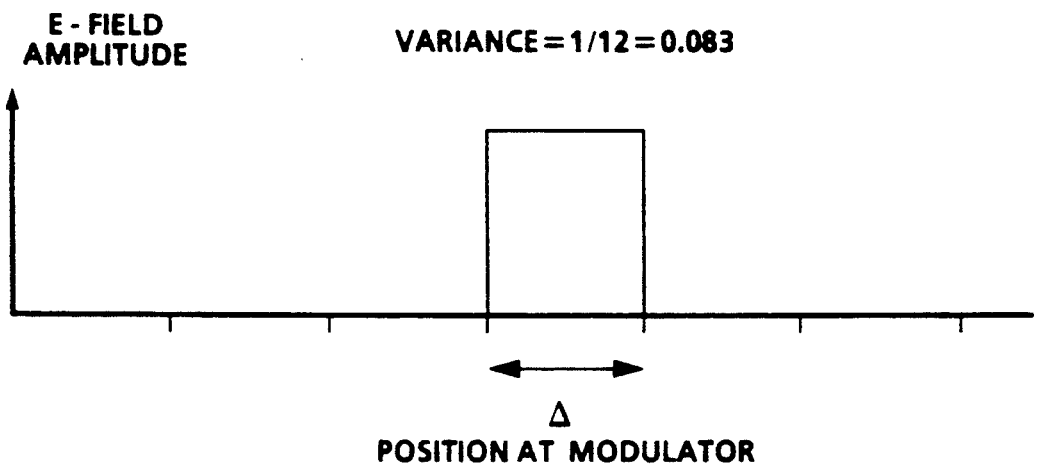

As broadly described above, the color line growth problem is created by a coherent optical effect that causes the exposure distribution for a colored pixel to be wider than desired. It will be assumed the color pixel, for purposes of further description, is a red pixel. To further understand the nature of the line growth problem and the proposed solutions to this problem, consider the following schematic representation of the imaging system operation that employs a variance model to describe the line growth phenomenon. FIG. 6 shows an idealized electric field amplitude exiting the modulator of the ROS system shown in FIG. 3 for a pattern consisting of a single pixel process direction red line on a white background. FIGS. 7 through 9 represent a modeling scheme that examines the behavior of the red and white pixels under convolution (a technique described in detail in *The Fourier Transform and its Applications* by R. M. Bracewell, McGraw Hill, (1965)). Considering first a nominal operating condition as shown in FIG. 6: a single red pixel on a white background where W is the pulse width of a white pixel, and $\Delta$ is the pixel addressability and is also the red pixel width pulse. Each white pulse is located in the center of each white pixel period. To analyze the exposure distribution line width dependences, the Gaussian illumination dependence at the modulator may be suppressed and the exiting electric field amplitude treated as being equivalent to the acoustic intensity profile, and the profile considered at one instant in time. The profile is considered at one instant in time. It is sufficient to consider the effect of the optical system to be that of simple low-pass spatial filtering. The filtering of the optical system is such that the pixel frequency is not passed at the Fourier plane (facet 87, FIG. 3), and therefore the white pattern has essentially zero modulation at photoreceptor 92. That is, the convolution of a repetitive white pixel pattern in the modulator with the optical transfer function gives a uniform output at the photoreceptor. The measured line Full Width at Half Maximum values (FWHM) will not be predicted by the variance calculations because electric field amplitude distributions, not exposure distributions (integrated irradiance), are being considered. Another aspect of the approximation is that the exposure distribution of a red line is not truly a Gaussian; variance and standard deviation do not relate exactly to the FWHM of an arbitrarily shaped distribution. However, the model allows a predication of the relationship between red lines on white and black backgrounds, as well as the dependence of red lines as the white level is varied.

The linearity of the convolution operator permits splitting the input distribution into several parts, performing the convolution with each part, and then combining the results. The distribution will be split into an all white pattern and a pattern containing two narrow rectangles. This modelling scheme treats a red pixel to be a white pixel plus a narrow rectangle of the same amplitude added to each side to fill the raster spacing shown in FIGS. 7a and 7b. The periodic pattern in FIG. 7(a) is filtered to be essentially constant. The rectangles in FIG. 7(b) therefore become the "object" that is imaged to form the red line. Compare this to the "object" that is imaged to form a red line on a black background, which is the special case where the white pixel pulse width is zero (W=0). The red on black case is shown in FIG. 8.

Figure 7B:
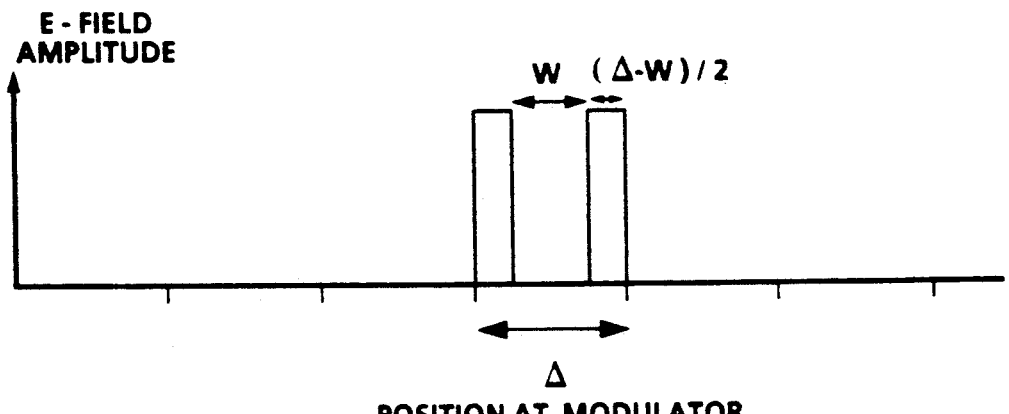

The behavior of variance under convolution allows an approximate prediction of the relative FWHM values of the cases shown in FIGS. 7b and 8. This is possible because the FWHM of a "Gaussian like" distribution is roughly proportional to the standard deviation of the distribution, which is equal to the square root of the variance. The distributions of interest here are the optical spread function and the "objects" that are imaged to form the line: the two rectangles in FIG. 9(a) for a red line on a white background and the single rectangle of FIG. 9(b) for the red-on-black case. The convolution/variance theorem states that variances add under convolution. Since the optical spread function is the same for all images, a comparison of the variances of the input lines determines the relationship of their output widths. The variance of the red-on-white "object" is greater than the variance of the red-on-black object (quantitative expressions are given in FIGS. 9a and b). This can be understood intuitively by noting that the red-on-white "object" has energy only at the extreme ends of its addressable space, while the red-on-black object has energy at the ends but also in the middle of its addressable space. It is this dispersion of energy in the red-on-white object that causes its FWHM to be larger than that of the red-on-black case. For the case shown in FIGS. 9a and b, the variance ratio is 1.76 (0.146/0.083) for red-on-white compared to red-on-black. The more general observation on variance is that as the white pulse width (W) is increased to raise the white exposure level, the energy of the "effective object" that forms a red line is more dispersed, which gives It a greater variance. These trends are seen in the measurements. A red line on a white background has a greater FWHM than a red line on a black background. Furthermore, the line width generally grows as the white level is increased. Other general trends can be examined using this variance model. It can be shown that the FWHM of a multiple pixel red line on a white background should have proportionately less growth than a single pixel line.

Figure 11A:
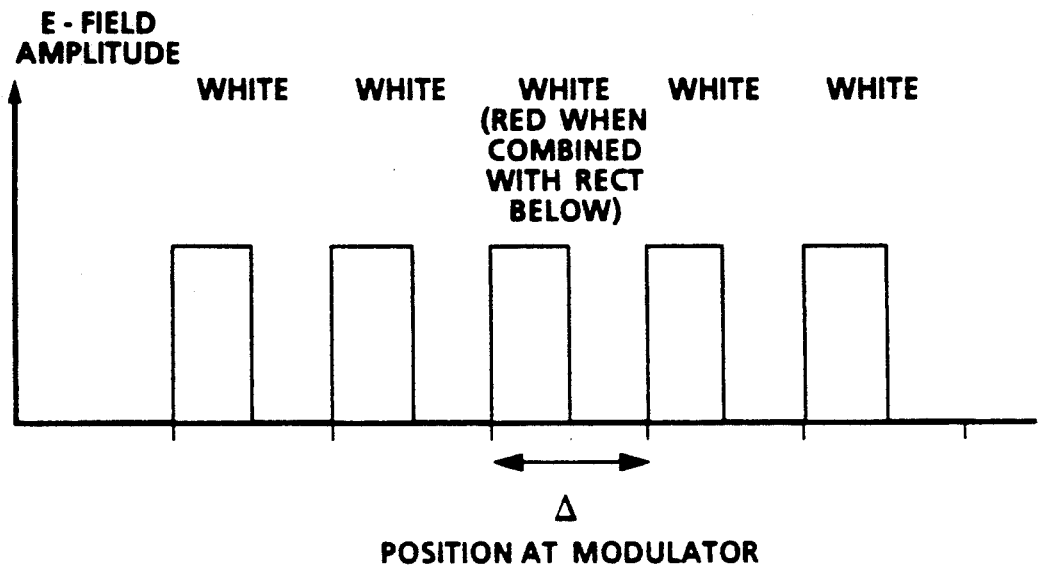
Figure 11B:
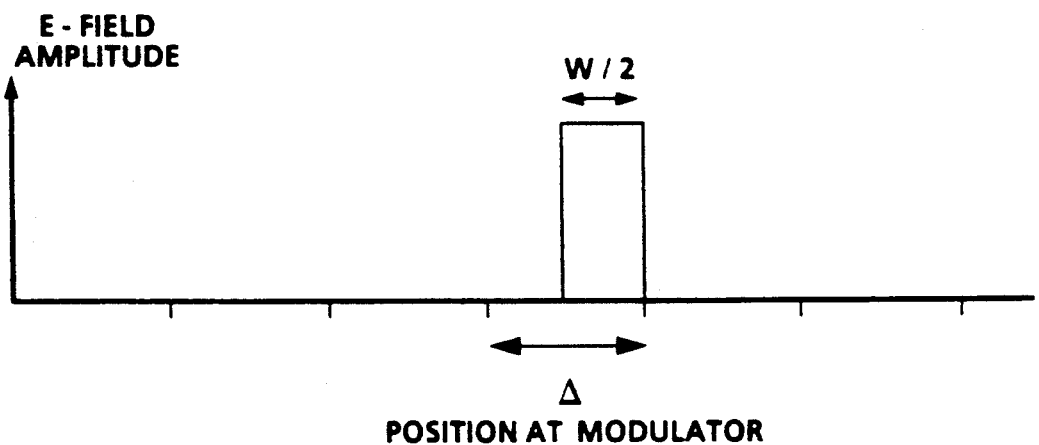

Considering now a first preferred solution to the color line growth problem, FIG. 10 shows an idealized electric field exiting the modulator when a correction scheme is employed to thin a single pixel red line. As shown above, the pattern is separated into a periodic part that will be filtered to be essentially constant and the remaining part, which is the object that is imaged to form the line. FIG. 11 shows the separated parts and we see that the object for line formation is compact as opposed to the dispersed object shown in FIG. 7(b) (uncorrected case). In FIG. 11(a), the segmented image is filtered to be essentially constant, while FIG. 11(b) shows the remaining pulses which form the red line. Thus, the imaged line must have a smaller variance (be thinner) in the corrected case.

To implement the preferred embodiment, the circuitry shown in FIGS. 12a and 12b is utilized. FIG. 12a is a block diagram of a portion of control circuit 84 showing the video path for the creation of pulse width modulated tri-level images. Video 1 signal (130) and video 2 signal (131) are the two input lines needed to encode the three different video outputs, i.e., black, white and color. Arbitration circuits 133 and 134 are used for test pattern generation and beam control signals. A clock (CLK) signal 136, synchronized with polygon sweep, is used to clock the video through the system. The Pulse Width Modulation (PWM) circuit 138 takes the CLK 136 and a PWM control signal 140 which defines the desired pulse width for white pixels and outputs the PWM waveform 142 used to gate the rf drive signal 83' to the A/O modulator 82 (FIG. 3). The arbitration circuitry 134 generates a composite video signal 84' to the rf drive to generate black, color, and white pixels as called for by the video 130 and video 131 data signals. FIG. 12b shows how a programmable delay in the pulse width modulation circuit 138 is used to translate the multiple bit PWM control signal into the needed PWM waveform. The CLK signal 136 is converted to a trigger 144 which is applied to a programmable delay pulse generator 145. The trigger is also applied to the set of a set/reset circuit 146 which generates the white PWM video signal 147. The PWM reset signal 148, which is a precisely delayed version of the trigger 144 which turned on the PWM video 142, is used to turn off the PWM video signal. The timing diagram 150 illustrates the relationships described above. Generator 145, for example, is a Brooktree Bt 604 dynamically programmed time edge vernier coupled to a digital-to-analog converter which controls the range of delays achievable.

FIG. 13 shows the exposure distribution for an uncorrected single pixel red line (solid distribution line) and a corrected red line (dotted distribution line) using the technique described above to shift the white pulses to the start of the white pixel periods. The corrected line has been effectively thinned by nearly a pixel (40.1 μm: 127.9 μm for uncorrected; 87.8 μm for a corrected measured at the 50% red bias level). A slight degree of ringing in the neighboring white region is present in the corrected case but does not adversely effect print quality.

As an alternate embodiment to that described above, PWPM circuit 138 is modified to divide each white pulse into two equal pulses, each pulse shifted to the outside edge of each pixel frame, as shown in FIG. 14.

Figure 5:
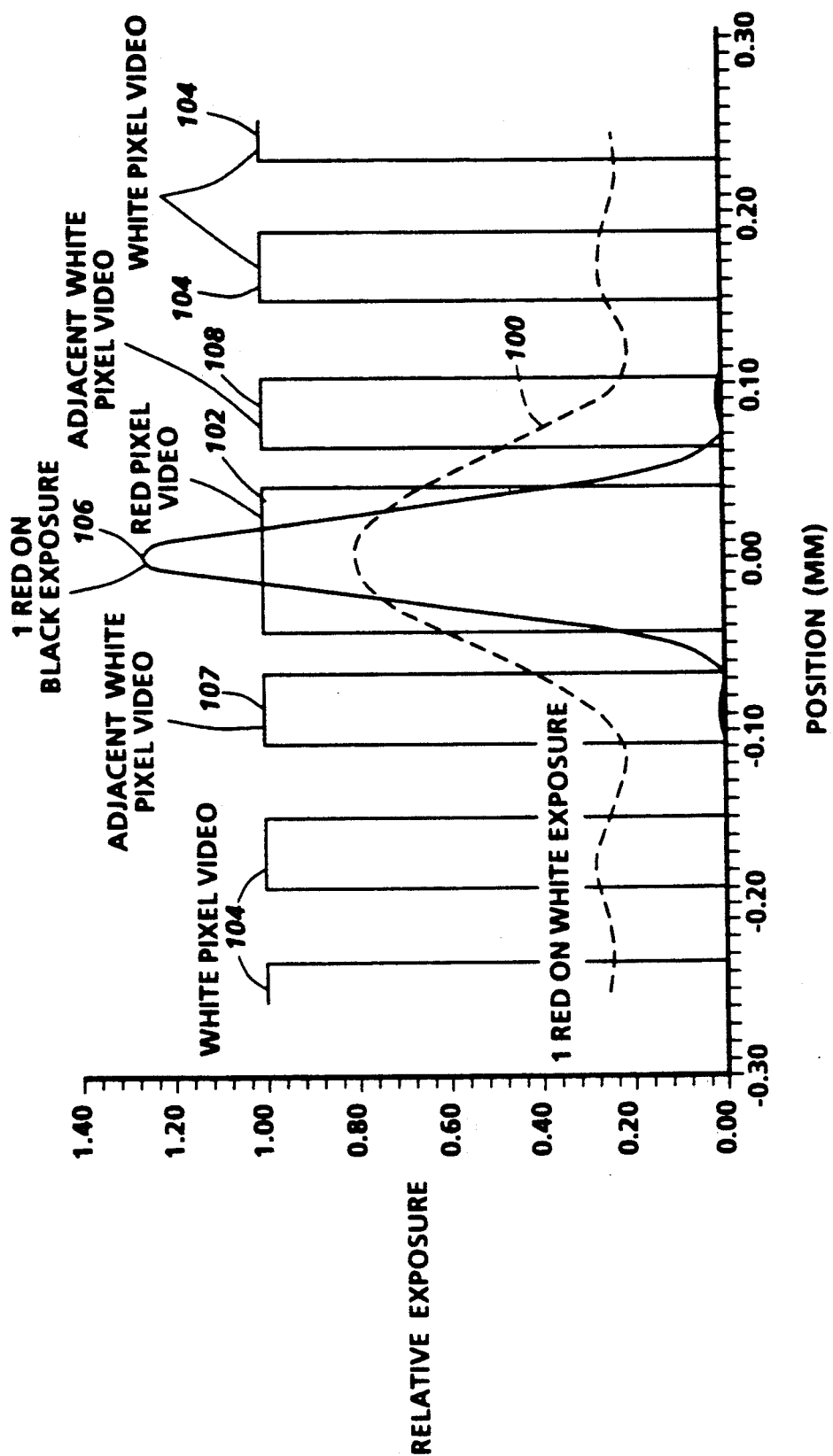
FIG. 5 is a plot of color line exposure in the process direction illustrating the color line growth problem.

The above described techniques each involve shifting the position of all white pixel pulses away from the conventional center position within the pixel period. A different class of color line growth solutions are directed towards identifying, in the video data input, white pixel and red pixel neighbor pairs, and performing various operations to effectively narrow one or the other of the pulses, or move only the white pulses that neighbor red pulses. As a first example, and referring to FIGS. 15 and 16, the video data is buffered in white/red discriminator buffer circuit 120, where groups of pixels are successively buffered and bit match searching accomplished to determine the relationship of the pixels. The output of circuit 120 is sent along two paths to RAMS 121, 122. The RAMS store the video pulse characteristics in mapping tables and enable mapping any allowable video data word to any allowable video pulse characteristic. The outputs of RAMS 121, 122 are sent to programmable delay circuits 123, 124, respectively. These delay circuits process the input signals from their respective RAMS to provide variable delays for the beginning and end of the video pulses. The pulse widths are determined by the difference between the two output delay signals. The outputs are applied to set/reset circuit 125 which generates the composite video signal. FIG. 17 shows the various pulse width and position combinations possible by circuit 138. To implement this first example, white pixels that are identified as being adjacent to a red pixel, are shifted by a distance appropriate to the total pixel addressability. For example, if the pixel addressability is 83 μm, a 5% shift of 4.2 μm would be appropriate. FIG. 16 shows the effects of such a shift in the exposure distribution. A white pixel, e.g. pixel 107 shown in FIG. 5, is shifted from its nominal (unshifted) position to a modified pulse shape that is narrower and with a higher peak. The same shifting would be performed on white pixel 108. An engineering trade off may have to be made to a slight increase in neighboring background modulation.

Instead of shifting the identified white pixels, an alternate technique is to narrow the white pixels; e.g. 107, 108, which have been identified as being adjacent a red pixel, e.g. 102, in buffering circuit 120. FIG. 18 shows the case where the neighboring white pixels, 107 and 108 have been narrowed from a nominal 50% width to a 40% width. As with the first technique, background modulation may increase.

These last two techniques described above are sensitive to total white exposure level, e.g. the red line growth will increase as the white exposure level increases. The white level may be varied for changes in copy mode of the imaging system, or to compensate for machine and environment fluctuations. The pixel operation is modified by utilizing a look up table 126 (FIG. 15) which generates a signal in response to a white exposure level change signal. Thus, the pixel shifting or narrowing is modified as a function of the white exposure level.

A still further technique is to modify the red pixels only. The video data stream is again examined in buffer 120; each red pixel identified has its video pulse width narrowed. FIG. 19 shows the case where two red pixel pulse widths have been reduced by 10%. The tradeoff for this solution is some loss of contrast. As with the white pixel narrowing, a look-up table may be needed to adjust for white exposure level changes. An alternative operation on red pixels, identified in buffer 120, is to modify only the lead and trail edge of pixels leading and trailing in a red line. Once a group of red pixels constituting a red line are identified, the lead edge of the lead red pixel and the trail edge of the trailing red pixel are trimmed. The interior red pixels are left unchanged. A trim of about 6% off each line end produces satisfactory separation from neighboring white pixels. This technique results in improved contrast over the previous red pixel narrowing techniques since energy is not removed from the central part of the line.

While all of the above techniques are directed to operation of an imaging system in a tri-level mode, the system may be operable in a conventional white/black mode or and executive mode (white and red pixels only). The circuits enabling the above techniques can also be used to operate in the non tri-level modes, e.g. if the printer were operating in color executive mode (white and color pixels only), the white pulse conversion would be applied to all the white pixels in the video pulse stream. If the printer were operating in the black executive mode (white and black pixels only), the non modified video stream, e.g. the original video pulse structure would be used.

And while the color line growth solutions were provided within the context of a pulsed imaging, pulse width modulation, facet tracking ROS, the principles are also applicable to a non-facet tracking ROS of the type, for example, disclosed in co-pending application Ser. No. 07/756,935, assigned to the same assignee as the present invention, and whose contents are hereby incorporated by reference.

While the invention has been described with reference to the structures disclosed, it is not confined to the details set forth but is intended to cover such modifications or changes as they come within the scope of the following claims.

What is claimed is:

1. A pulsed imaging, facet tracked, pulse width modulation scanner for forming three charge levels of exposure at a surface of a photoreceptor, consisting of a first fully charged area representing exposure of black information, a second completely discharged area representing exposure of color information and a third partially discharged area representing exposure of white information, means for uniformly charging a surface of said photoreceptor, laser means for providing a coherent, focused beam of radiant energy, control circuit means for converting an image bit map video data stream into a composite analog video image data stream consisting of a plurality of pixels, each pixel having a pulse width corresponding to one of said three charge levels of exposure, an acoustooptic modulator for modulating said beam in response to said analog video image data stream simultaneously applied to the modulator to provide a modulated optical video output, a rotatable scanning element interposed between said photoreceptor and said laser means, said scanning element having a plurality of facets for intercepting the modulated optical video output and repeatedly scanning said output, as reflected beams across the surface of said photoreceptor to form said three charge levels of exposure, first optical means interposed between said modulator and said scanning element for performing a Fourier transformation of the modulated optical video output and for projecting a Fourier irradiance profile onto facets of the rotatable scanning element, said element positioned in a Fourier plane, said facets acting as a bandpass filter to limit reflection of higher frequencies of the modulated optical video output to the photoreceptor member, and second optical means positioned between the scanning element and the photoreceptor for focusing the reflected beams from the scanning element along a scan line on the photoreceptor surface, said first and second optical means balancing acoustic and scan velocities to maintain a stationary acoustic image at the photoreceptor surface.

2. The scanner of claim 1 wherein said pixel pulse widths have a leading and trailing edge and wherein said control circuit means includes circuitry or positioning pixels representing a partially discharged area at the leading edge of the associated pixel pulse width.

3. The scanner of claim 1 wherein said control means include circuitry for identifying neighboring pixels having a pulse width corresponding to an area to be partially discharged and an area to be completely discharged.

4. A method for eliminating color line growth in a process direction in a tri-level pulsed imaging, pulse width modulation system including the steps of:

uniformly charging a surface of a photoreceptor member, generating pulse width modulated image video data signals, said signals representing black, color and white exposure discharge levels at the surface of the photoreceptor member, said data signals contained within pixel periods of equal width, each period having a beginning and an end, said color and white exposure discharge levels represented by color and white pulses within an associated pixel period, said color pulses having a width approximately equal to the width of the associated pixel period and said white pulses having a width less than the associated pixel period, said white pulses located at a beginning or end of the pixel period associated with the white pulse, exposing said charged photoreceptor member surface to said video data signals to form said black color, and white exposure discharge levels and including the further step of dividing each white pulse into two equal half pulses and locating said half pulses at the beginning and end of each pixel period.

5. The method of claim 1 including the step of first identifying a white pulse adjacent a color pulse and then performing the dividing step.

6. A highlight color printer which exposes a previously charged photosensitive recording medium, moving in a process direction, at three exposure levels comprising:

means for providing a coherent, focused beam of radiant energy, means for generating pulse width modulated image video data signals contained within associated pixel periods, said signals representing black, white and color information, acoustooptic type modulator means for modulating said beam in accordance with the information represented by said video data signals to produce a modulated output beam, and polygon scanning means interposed between said modulator means and said photosensitive recording medium, said polygon scanning means having a plurality of facets for intercepting said modulated beam output to repeatedly scan said beam across said photosensitive recording medium in a fast scan direction, said polygon scanning means adapted to filter side bands of those portions of the modulated beam output corresponding to white information video data signals to reduce the illumination intensity of the color information video data signals, whereby the recording medium is exposed at three discharge levels, zero discharge corresponding to black information video data signals, full discharge corresponding to color information video data signals and an intermediate discharge representing white information video data signals.

7. The printer of claim 6 further including circuit means for modifying location of white information video data signals within an associated pixel period, each pixel period having a characteristic width with a beginning and an end to eliminate line growth of the color information in the recording medium.

8. The printer of claim 7 wherein said modifying circuit means includes a buffering discrimination circuit which identifies neighboring pixel periods containing color and white information video data signals.

9. The printer of claim 7 wherein said modifying circuit means further includes means for shifting white information video data signals away from neighboring pixel periods containing color information video data signals.

10. The printer of claim 7 wherein said modifying circuit means further includes means for narrowing the width of the pixel period containing white information video data signals.

11. The printer of claim 7 wherein said modifying circuit means shifts a white information video data signal to the beginning of the associated pixel period.

12. The printer of claim 7 wherein said modifying circuit means splits said white information video data signals in half and moves each half to the beginning and end of the associated pixel period.

13. The printer of claim 7 wherein said modifying circuit means includes means for narrowing the pixel period width of all color information video data signals.

14. The of claim 7 wherein said modifying circuit means includes a means for identifying grouping of color information video data signals, each signal having a leading and trailing edge representing a color line and for trimming off the leading edge of a lead color information video data signal and the trailing edge of a trailing color information video data signal while leaving the color information video data signals unchanged.

15. The printer of claim 6 further including means for modifying said color information video data signals to increasingly separate said signals so as to reduce interaction between exposed areas of the photosensitive recording medium.

16. An apparatus for creating tri-level images on a charge retentive surface, said apparatus comprising:

means for uniformly charging said charge retentive surface, a pulsed imaging, facet tracked, pulse width modulated raster output scanner for exposing said uniformly charged surface to form black charged area images, color discharged area images and white intermediate discharged area images, said output scanner comprising:

means for providing a beam of high intensity radiation, an acoustooptic modulator for modulating said beam in response to an image signal input containing a signal stream of information pulses contained within associated pixel periods, representative of black charged area images, color discharged area images and white intermediate discharged areas, wherein a modulated output beam is generated, a polygon scanner having a plurality of facets for line scanning said modulated output beam across said charge retentive surface first optical means for performing a Fourier transformation of the modulated output beam and for projecting a Fourier profile of the Fourier transformed output beam onto reflective facets of the polygon scanner positioned in a Fourier plane, each facet acting as a spatial bandpass filter limiting the reflection of predetermined frequencies of incident Fourier transformed output beam, and second optical means positioned between the polygon scanner and the charge retentive surface for focusing the modulated output beam from the polygon scanner along a scan line on the charge retentive surface, said first and second optical means balancing acoustic and scan velocities to maintain a stationary acoustic image at the charge retentive surface.

17. The apparatus of claim 16 wherein said first optical means includes discrimination means for increasing spacing between information pulses representative of white and color discharged areas.

18. The apparatus of claim 16 wherein each black, white or color pulse is located within an associated pixel period having a beginning and an end and wherein each white pulse is located at the beginning of the associated pixel period.

* * * * *

UNITED STATES PATENT AND TRADEMARK OFFICE
CERTIFICATE OF CORRECTION

PATENT NO. : 5,260,799
DATED : Nov. 9, 1993
INVENTOR(S) : Lace et al.

It is certified that error appears in the above-identified patent and that said Letters Patent is hereby corrected as shown below:

On title page,

Inventor's Name should read item [75]  Melvin E. Swanberg
item [19]  Swangberg et al.

Signed and Sealed this

Third Day of May, 1994

Attest:

BRUCE LEHMAN

Attesting Officer

Commissioner of Patents and Trademarks